US009209693B2

(12) United States Patent
Davidson et al.

(10) Patent No.: US 9,209,693 B2
(45) Date of Patent: Dec. 8, 2015

(54) CONTROL CIRCUIT FOR DC NETWORK TO MAINTAIN ZERO NET CHANGE IN ENERGY LEVEL

(75) Inventors: Colin Charnock Davidson, Walton on the Hill (GB); David Reginald Trainer, Alvaston (GB); Nnamdi Okaeme, London (GB)

(73) Assignee: ALSTOM TECHNOLOGY LTD, Baden (CH)

( * ) Notice: Subject to any disclaimer, the term of this patent is extended or adjusted under 35 U.S.C. 154(b) by 4 days.

(21) Appl. No.: 14/356,882

(22) PCT Filed: Nov. 7, 2011

(86) PCT No.: PCT/EP2011/069563
§ 371 (c)(1),
(2), (4) Date: May 7, 2014

(87) PCT Pub. No.: WO2013/068031
PCT Pub. Date: May 16, 2013

(65) Prior Publication Data
US 2015/0028826 A1 Jan. 29, 2015

(51) Int. Cl.
*H02M 3/158* (2006.01)
*H02M 1/08* (2006.01)
(Continued)

(52) U.S. Cl.
CPC ............... *H02M 3/158* (2013.01); *H02M 1/08* (2013.01); *H02M 1/32* (2013.01); *H02H 7/268* (2013.01); *H02J 3/36* (2013.01); *H02M 2007/4835* (2013.01); *Y02E 60/60* (2013.01)

(58) Field of Classification Search
CPC .................................................... H02M 3/158
See application file for complete search history.

(56) References Cited

U.S. PATENT DOCUMENTS 3,857,083 A 12/1974 Lundstrom
3,867,643 A 2/1975 Baker et al.
(Continued)

FOREIGN PATENT DOCUMENTS

CN 101 795 072 A 8/2010
DE 43 17 965 12/1994
(Continued)

OTHER PUBLICATIONS

Allebrod, S. et al., "New Transformerless, Scalable Modular Multilevel Converters for HVDC—Transmission", Power Electronics Specialists Conference, IEEE, Jun. 15, 2008, pp. 174-179.
(Continued)

*Primary Examiner* — Emily P Pham
(74) *Attorney, Agent, or Firm* — Nixon Peabody LLP

(57) ABSTRACT

There is a control circuit comprising first and second DC terminals for connection to a DC network, the first and second DC terminals having a plurality of modules and at least one energy conversion element connected in series therebetween to define a current transmission path, the plurality of modules defining a chain-link converter, each module including at least one energy storage device, the or each energy storage device being selectively removable from the current transmission path to cause a current waveform to flow from the DC network through the current transmission path and the or each energy conversion element and thereby remove energy from the DC network, the or each energy storage device being selectively removable from the current transmission path to modulate the current waveform to maintain a zero net change in energy level of the chain-link converter.

17 Claims, 23 Drawing Sheets

(51) Int. Cl.
  *H02M 1/32* (2007.01)
  *H02H 7/26* (2006.01)
  *H02J 3/36* (2006.01)
  *H02M 7/483* (2007.01)

(56) References Cited

U.S. PATENT DOCUMENTS

| | | |
|---|---|---|
| 4,053,820 A | 10/1977 | Peterson et al. |
| 4,636,907 A | 1/1987 | Howell |
| 4,663,702 A | 5/1987 | Tanaka |
| 4,816,736 A | 3/1989 | Dougherty et al. |
| 5,027,264 A | 6/1991 | DeDoncker et al. |
| 5,093,583 A | 3/1992 | Mashino et al. |
| 5,164,872 A | 11/1992 | Howell |
| 5,339,210 A | 8/1994 | Howell |
| 5,345,375 A | 9/1994 | Mohan |
| 5,499,178 A | 3/1996 | Mohan |
| 5,515,264 A | 5/1996 | Stacey |
| 5,532,575 A | 7/1996 | Ainsworth et al. |
| 5,561,595 A | 10/1996 | Smith |
| 5,644,482 A | 7/1997 | Asplund |
| 5,673,189 A | 9/1997 | Schettler |
| 5,719,486 A | 2/1998 | Taniguchi et al. |
| 5,726,557 A | 3/1998 | Umeda et al. |
| 5,870,293 A | 2/1999 | Svensson et al. |
| 5,889,667 A | 3/1999 | Bernet |
| 5,892,677 A | 4/1999 | Chang |
| 5,936,855 A | 8/1999 | Salmon |
| 5,986,909 A | 11/1999 | Hammond et al. |
| 5,999,422 A | 12/1999 | Goransson et al. |
| 6,134,126 A | 10/2000 | Ikekame et al. |
| 6,236,580 B1 | 5/2001 | Aiello et al. |
| 6,301,130 B1 | 10/2001 | Aiello et al. |
| 6,320,767 B1 | 11/2001 | Shimoura et al. |
| 6,392,348 B1 | 5/2002 | Dougherty |
| 6,442,051 B1 | 8/2002 | Ryan et al. |
| 6,603,675 B1 | 8/2003 | Norrga |
| 6,879,062 B2 | 4/2005 | Oates |
| 6,987,680 B2 | 1/2006 | Vire et al. |
| 7,050,311 B2 | 5/2006 | Lai et al. |
| 7,170,767 B2 | 1/2007 | Bixel |
| 7,199,535 B2 | 4/2007 | Welchko et al. |
| 7,274,576 B1 | 9/2007 | Zargari et al. |
| 7,292,462 B2 | 11/2007 | Watanabe et al. |
| 7,298,115 B2 | 11/2007 | Nishimura et al. |
| 7,499,291 B2 | 3/2009 | Han |
| 7,622,825 B2 | 11/2009 | Brune et al. |
| 7,729,144 B2 | 6/2010 | Urakabe et al. |
| 8,188,720 B2 | 5/2012 | Kim et al. |
| 8,294,408 B2 | 10/2012 | Matt et al. |
| 8,390,259 B2 | 3/2013 | Dommaschk et al. |
| 8,599,591 B2 | 12/2013 | Crookes et al. |
| 8,854,843 B2 | 10/2014 | Trainer et al. |
| 8,861,231 B2 | 10/2014 | Cross et al. |
| 8,861,234 B2 | 10/2014 | Trainer et al. |
| 8,867,242 B2 | 10/2014 | Clare et al. |
| 8,867,244 B2 | 10/2014 | Trainer et al. |
| 8,934,268 B2 | 1/2015 | Trainer et al. |
| 9,065,299 B2 | 6/2015 | Trainer et al. |
| 2002/0060497 A1 | 5/2002 | Arita et al. |
| 2002/0176265 A1 | 11/2002 | Oates |
| 2003/0202367 A1 | 10/2003 | Schreiber |
| 2004/0218318 A1 | 11/2004 | Bijlenga et al. |
| 2005/0127853 A1 | 6/2005 | Su |
| 2005/0135126 A1 | 6/2005 | Gazel et al. |
| 2005/0146226 A1 | 7/2005 | Trainer et al. |
| 2008/0002443 A1 | 1/2008 | Ueda et al. |
| 2008/0007978 A1 | 1/2008 | Han |
| 2008/0179951 A1 | 7/2008 | Brune et al. |
| 2008/0197966 A1 | 8/2008 | Sommer |
| 2008/0205093 A1 | 8/2008 | Davies et al. |
| 2008/0258661 A1 | 10/2008 | Nagashima et al. |
| 2008/0310205 A1 | 12/2008 | Hiller |
| 2009/0021966 A1 | 1/2009 | Jacobson et al. |
| 2009/0027934 A1 | 1/2009 | Bustos |
| 2009/0033254 A1 | 2/2009 | Nagashima et al. |
| 2009/0085548 A1 | 4/2009 | Suh et al. |
| 2009/0102436 A1 | 4/2009 | Valderrama et al. |
| 2009/0116268 A1* | 5/2009 | Kishida et al. .................. 363/68 |
| 2009/0206781 A1 | 8/2009 | Itoh et al. |
| 2010/0067266 A1 | 3/2010 | Dommaschk et al. |
| 2010/0118578 A1 | 5/2010 | Dommaschk et al. |
| 2010/0309698 A1 | 12/2010 | Asplund et al. |
| 2011/0018481 A1 | 1/2011 | Hiller |
| 2011/0044077 A1 | 2/2011 | Nielsen |
| 2011/0205768 A1* | 8/2011 | Svensson .......................... 363/49 |
| 2011/0260701 A1 | 10/2011 | Horger et al. |
| 2011/0280049 A1* | 11/2011 | Mori et al. ...................... 363/25 |
| 2012/0026767 A1 | 2/2012 | Inoue et al. |
| 2012/0063185 A1 | 3/2012 | Janning |
| 2012/0069610 A1 | 3/2012 | Trainer et al. |
| 2012/0120697 A1 | 5/2012 | Cuk |
| 2012/0127766 A1 | 5/2012 | Crookes et al. |
| 2012/0170338 A1 | 7/2012 | Trainer et al. |
| 2012/0182771 A1 | 7/2012 | Trainer et al. |
| 2012/0188803 A1 | 7/2012 | Trainer et al. |
| 2012/0195084 A1 | 8/2012 | Norrga |
| 2013/0026841 A1 | 1/2013 | Hosini et al. |
| 2013/0051105 A1 | 2/2013 | Wang et al. |
| 2013/0094264 A1 | 4/2013 | Crookes et al. |
| 2013/0099572 A1 | 4/2013 | Norrga |
| 2013/0119970 A1 | 5/2013 | Trainer et al. |
| 2013/0128629 A1 | 5/2013 | Clare et al. |
| 2013/0128636 A1 | 5/2013 | Trainer et al. |
| 2013/0182467 A1 | 7/2013 | Cross et al. |
| 2013/0194838 A1 | 8/2013 | Jang et al. |
| 2013/0208514 A1 | 8/2013 | Trainer et al. |
| 2013/0208521 A1 | 8/2013 | Trainer et al. |
| 2013/0279211 A1 | 10/2013 | Green et al. |
| 2014/0098575 A1 | 4/2014 | Whitehouse |
| 2014/0133196 A1 | 5/2014 | Trainer |
| 2014/0146583 A1 | 5/2014 | Trainer et al. |
| 2014/0254205 A1 | 9/2014 | Trainer et al. |
| 2014/0293656 A1 | 10/2014 | Trainer et al. |
| 2014/0293668 A1 | 10/2014 | Trainer et al. |
| 2014/0313797 A1 | 10/2014 | Davidson et al. |
| 2015/0003134 A1 | 1/2015 | Trainer et al. |
| 2015/0009594 A1 | 1/2015 | Okaeme et al. |
| 2015/0116881 A1 | 4/2015 | Burnett et al. |
| 2015/0131189 A1 | 5/2015 | Davidson et al. |
| 2015/0214834 A1 | 7/2015 | Trainer et al. |

FOREIGN PATENT DOCUMENTS

| | | |
|---|---|---|
| DE | 195 35 552 | 4/1996 |
| DE | 101 03 031 | 7/2002 |
| DE | 10 2005 040 432 | 3/2007 |
| DE | 10 2007 003 172 | 2/2008 |
| DE | 10 2008 04524 | 3/2008 |
| DE | 10 2008 014 898 | 9/2009 |
| DE | 10 2010 007 452 | 8/2011 |
| EP | 0 868 001 A2 | 9/1998 |
| EP | 0 867 998 B1 | 3/2007 |
| EP | 1 800 391 A2 | 6/2007 |
| GB | 2 294 821 A | 5/1996 |
| GB | 2 375 902 A | 11/2002 |
| GB | 2 418 079 A | 3/2006 |
| JP | 2008-125310 A | 5/2008 |
| WO | WO 97/02639 | 1/1997 |
| WO | WO 02/50972 | 6/2002 |
| WO | WO 02/063758 | 8/2002 |
| WO | WO 03/055048 | 7/2003 |
| WO | WO 2007/023061 A2 | 3/2007 |
| WO | WO 2007/028349 | 3/2007 |
| WO | WO 2007/028350 | 3/2007 |
| WO | WO 2007/033852 | 3/2007 |
| WO | WO 2008/024038 | 2/2008 |
| WO | WO 2008/086760 | 7/2008 |
| WO | WO 2009/149743 | 12/2009 |
| WO | WO 2010/015432 A1 | 2/2010 |
| WO | WO 2010/025758 | 3/2010 |
| WO | WO 2010/040388 | 4/2010 |
| WO | WO 2010/069371 | 6/2010 |
| WO | WO 2010/088969 | 8/2010 |

(56) References Cited

FOREIGN PATENT DOCUMENTS

| WO | WO 2010/112523 | 10/2010 |
|---|---|---|
| WO | WO 2010/145688 | 12/2010 |
| WO | WO 2010/145689 | 12/2010 |
| WO | WO 2010/145690 | 12/2010 |
| WO | WO 2010/149200 | 12/2010 |
| WO | WO 2011/012171 | 2/2011 |
| WO | WO 2011/012174 | 2/2011 |
| WO | WO 2011/015227 | 2/2011 |
| WO | WO 2011/029480 | 3/2011 |
| WO | WO 2011/044928 | 4/2011 |
| WO | WO 2011/050847 | 5/2011 |
| WO | WO 2011/098117 | 8/2011 |
| WO | 2011/116816 A1 | 9/2011 |
| WO | WO 2011/113471 | 9/2011 |
| WO | WO 2011/124258 | 10/2011 |
| WO | WO 2011/127980 | 10/2011 |
| WO | WO 2011/141054 | 11/2011 |
| WO | WO 2011/157300 | 12/2011 |
| WO | 2012/007040 A1 | 1/2012 |
| WO | WO 2012/013248 | 2/2012 |
| WO | WO 2012/025142 | 3/2012 |
| WO | WO 2012/167826 | 12/2012 |
| WO | WO 2013/000510 | 1/2013 |
| WO | WO 2013/068031 A1 | 5/2013 |
| WO | WO 2013/071975 | 5/2013 |
| WO | WO 2013/017160 | 7/2013 |
| WO | WO 2013/017177 | 7/2013 |
| WO | WO 2013/120528 A1 | 8/2013 |
| WO | WO 2013/127461 | 9/2013 |
| WO | WO 2013/127462 | 9/2013 |
| WO | WO 2013/127463 | 9/2013 |

OTHER PUBLICATIONS

Alstom Grid, "HVDC-VSC: transmission technology of the future", Alstrom Grid, Spring-Summer 2011, Retrieved from the Internet: URL: http://www.tresamigasllc.com/docs/ThinkGrid08-06-Chapter1-Art1%20VSC_EN.pdf [retrieved on Oct. 2010], pp. 13-17.

Baran, M. E. et al., "Overcurrent Protection in DC Zonal Shipboard Power Systems using Solid State Protection Devices", Electric Ship Technologies Symposium, 2007, ESTS '07, IEEE, IEEE, PI, May 1, 2007, pp. 221-224.

Cheng, Y. et al., "A Comparison of Diode-Clamped and Cascaded Multilevel Converters for a STATCOM With Energy Storage", IEEE Transactions on Industrial Electronics, vol. 53, Issue 5, Oct. 2006, pp. 1512-1521.

Davidson, C.C. et al., "Innovative Concepts For Hybrid Multi-Level Converters For HVDC Power Transmission", 9th IET International Conference on AC and DC Power Transmission, ACDC 2010, Oct. 19-21, 2010, 5 pages.

Ertl, H et al., "A Constant Output Current Three-Phase Diode Bridge Rectifier Employing a Novel Electronic Smoothing Inductor", IEEE Transactions on Industrial Electronics, vol. 52, Issue 2, Apr. 1, 2005, pp. 454-461.

Flourentzou, Nikolas et al., "VSC-Based HVDC Power Transmission Systems: An Overview", IEEE Transactions on Power Electronics, vol. 24, No. 3, Mar. 2009, pp. 592-602.

Glinka, M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.

Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, pp. 1-8.

Hagiwara, M. et al., "PWM Control and Experiment of Modular Multilevel Converters", Power Electronics Specialists Conference (PESC), Rhodes, Jun. 15-19, 2008, IEEE, pp. 154-161.

Hagiwara, M. et al., "Control and Experiment of Pulsewidth-Modulated Modular Multilevel Converters", IEEE Transactions on Power Electronics, IEEE Service Center, Piscataway, NJ, vol. 24, Issue 7, Jul. 1, 2009, pp. 1737-1746.

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", European Power Electronics Conference (EPE), Toulouse, France, Sep. 2-4, 2003, 10 pages.

Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.

Qahraman, B. et al., "A VSC Based Series Hybrid Converter for HVDC Transmission", Canadian Conference Electrical and Computer Engineering Conference, 2005, CCECE/CCGEI, Saskatoon, May 1-4, 2005, pp. 458-461.

Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.

Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.

Watkins, S.J. et al., "Multilevel Asymmetric Power Converters For Switched Reluctance Machines", International Conference on Power Electronics, Machines and Drives, Apr. 16-18, 2002, IEEE 2002, Conf. Publ. No. 487, pp. 195-200.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Search Report and Written Opinion for Application No. PCT/EP2009/057388, mailed on Mar. 18, 2010.

PCT International Preliminary Report on Patentability in International Application No. PCT/EP2009/057388, mailed on Dec. 14, 2011.

PCT International Search Report and Written Opinion in International Application No. PCT/EP2009/057736, mailed on Mar. 26, 2010.

PCT International Preliminary Report on Patentability in International Application No. PCT/EP2009/057736, mailed on Nov. 24, 2011.

PCT International Search Report and Written Opinion in International Application No. PCT/EP2009/059973, mailed on Aug. 13, 2010.

PCT International Preliminary Report on Patentability in International Application No. PCT/EP2009/059973, mailed on Oct. 5, 2011.

PCT International Search Report and Written Opinion in International Application No. PCT/EP2010/051572, mailed on Jan. 19, 2011.

PCT International Preliminary Report on Patentability in International Application No. PCT/EP2010/051572, mailed on Apr. 20, 2012.

(56) References Cited

OTHER PUBLICATIONS

PCT International Search Report and Written Opinion in International Application No. PCT/EP2010/053290, mailed on Feb. 11, 2011.
PCT International Preliminary Report on Patentability in International Application No. PCT/EP2010/053290, mailed on Apr. 20, 2012.
PCT International Search Report and Written Opinion in International Application No. PCT/EP2010/054660, mailed on Feb. 24, 2011.
PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report in International Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP10/62316, mailed on Jul. 6, 2011.
PCT International Preliminary Report on Patentability in International Application No. PCT/EP10/62316, mailed on Mar. 7, 2013.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Search Report and Written Opinion in International Application No. PCT/EP2011/064545, mailed Jun. 11, 2012.
PCT International Preliminary Report on Patentability in International Application No. PCT/EP2011/064545, mailed May 19, 2014.
PCT International Preliminary Report on Patentability in International Application No. PCT/EP2011/069563, mailed on Dec. 13, 2013.
PCT International Search Report and Written Opinion in International Application No. PCT/EP2011/070402, mailed on Sep. 27, 2012.
PCT International Preliminary Report on Patentability in International Application No. PCT/EP2011/070402, mailed on Feb. 18, 2014.
PCT International Search Report and Written Opinion in International Application No. PCT/EP2012/052692, mailed Mar. 1, 2013.
PCT International Preliminary Report on Patentability in International Application No. PCT/EP2012/052692, mailed on Sep. 10, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
First Chinese Office Action in Application No. 200980160700.4, mailed Jun. 25, 2014.
Notice of Allowance in U.S. Appl. No. 13/378,336, mailed on Feb. 6, 2014.
Notice of Allowance in U.S. Appl. No. 13/378,336, mailed on Jun. 13, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Office Action in U.S. Appl. No. 13/388,277, mailed on Nov. 22, 2013.
Office Action in U.S. Appl. No. 13/388,277, mailed on Jul. 3, 2014.
Office Action in U.S. Appl. No. 13/388,277, mailed on Mar. 18, 2015.
Notice of Allowance in U.S. Appl. No. 13/576,920, mailed on Dec. 4, 2013.
Notice of Allowance in U.S. Appl. No. 13/576,920, mailed on Mar. 20, 2014.
Notice of Allowance in U.S. Appl. No. 13/576,920, mailed on Jun. 9, 2014.
Office Action in U.S. Appl. No. 13/634,205, mailed on Sep. 22, 2014.
Notice of Allowance in U.S. Appl. No. 13/634,205, mailed on Apr. 27, 2015.
Office Action in U.S. Appl. No. 13/639,844, mailed on May 22, 2014.
Notice of Allowance in U.S. Appl. No. 13/639,844, mailed on Sep. 8, 2014.
Notice of Allowance in U.S. Appl. No. 13/640,468, mailed on Jun. 4, 2014.
Notice of Allowance in U.S. Appl. No. 13/805,333, mailed on Feb. 2, 2015.
Notice of Allowance in U.S. Appl. No. 13/813,414, mailed on Jun. 2, 2014.
Notice of Allowance in U.S. Appl. No. 13/818,654, mailed on May 30, 2014.
Office Action in U.S. Appl. No. 14/129,923, mailed on Feb. 17, 2015.
Office Action in U.S. Appl. No. 14/359,088, mailed on Apr. 7, 2015.
U.S. Appl. No. 14/379,746, filed Aug. 28, 2014.
U.S. Appl. No. 14/381,570, filed Aug. 27, 2014.
U.S. Appl. No. 14/357,908, filed May 13, 2014.
PCT Search Report in PCT/EP2011/069563, Alessandro Colombo, European Patent Office, Rijswijk NL, Aug. 8, 2012.
Office Action in U.S. Appl. No. 14/236,628, mailed on Jul. 31, 2015.
Office Action in U.S. Appl. No. 14/236,627, mailed on Aug. 4, 2015.
Office Action in U.S. Appl. No. 14/129,923, mailed on Sep. 18, 2015.
Office Action in U.S. Appl. No. 13/388,277, mailed on Oct. 7, 2015.
Office Action in U.S. Appl. No. 14/124,704, mailed on Aug. 28, 2015.
Office Action in U.S. Appl. No. 14/377,824, mailed on Sep. 1, 2015.

\* cited by examiner

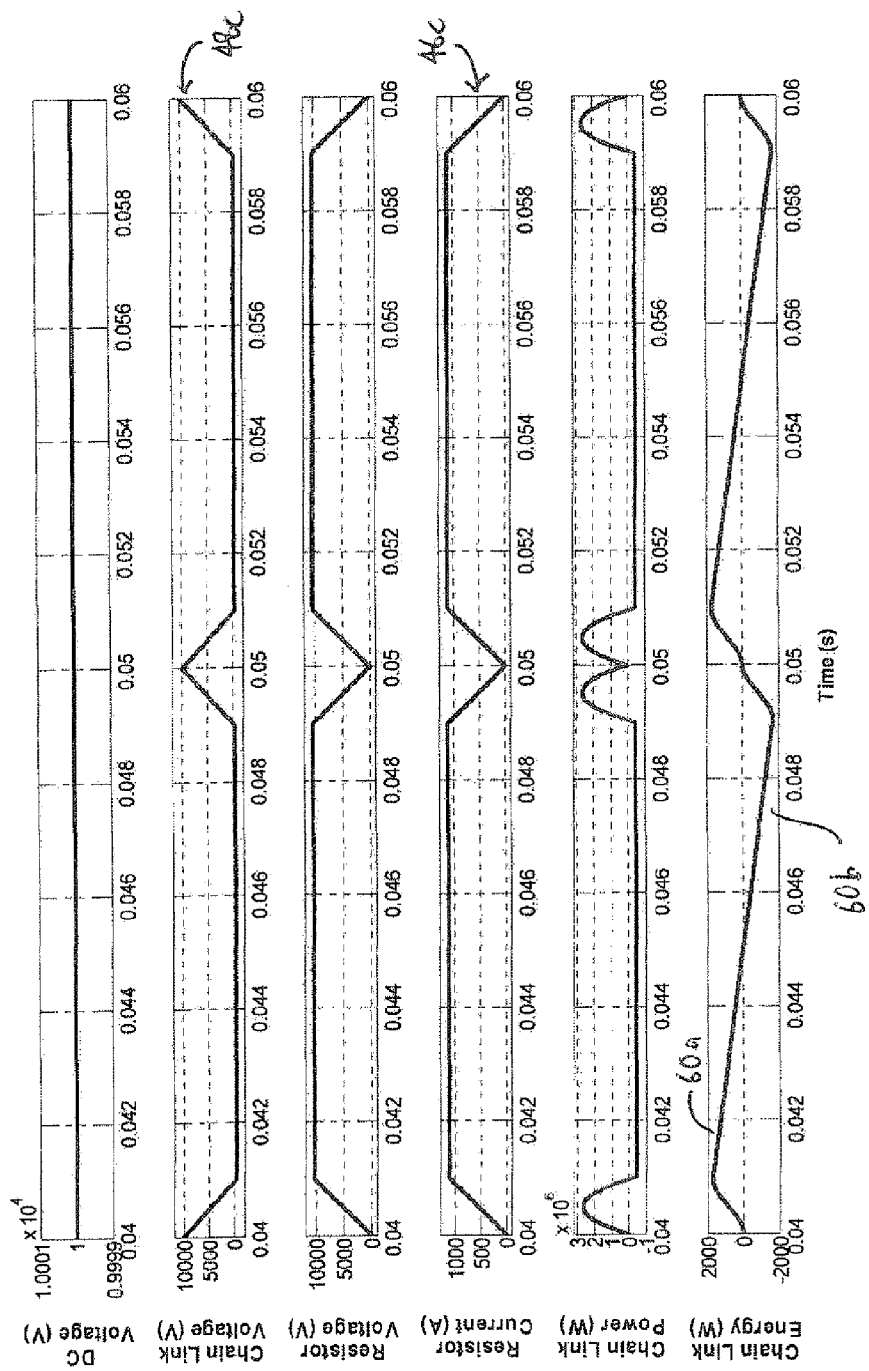

CONTROL CIRCUIT FOR DC NETWORK TO MAINTAIN ZERO NET CHANGE IN ENERGY LEVEL

CROSS-REFERENCE TO RELATED PATENT APPLICATION

The present application is a National Stage Application of International Application No. PCT/EP2011/069563 entitled "CONTROL CIRCUIT" filed Nov. 7, 2011, the contents of which are incorporated herein by reference in their entirety.

The invention relates to a control circuit.

In DC power transmission schemes, DC transmission lines 10a,10b are used to interconnect a transmitting electrical network 12 and a receiving electrical network 14 to permit transfer of power between the two electrical networks 12,14, as shown in FIG. 1. In the event of a fault 16 preventing the receiving electrical network 14 from receiving power from the DC transmission lines 10a,10b, the transmitting electrical network 12 cannot interrupt the transmission of power into the DC transmission lines 10a,10b. This is because generators, such as wind turbines, cannot be switched off instantaneously and so will continue to feed energy 18 into the DC transmission lines 10a,10b. Moreover, the receiving electrical network 14 is required by a Grid Code to ride through a supply dip, e.g. where the voltage is reduced to approximately 15% of its original value, and to resume the transmission of power upon the removal of the fault 16.

Continuing to transmit power into the DC transmission lines 10a,10b results in an accumulation of excess power in the DC transmission lines 10a,10b which not only adversely affects the balance between the transmission and receipt of power by the respective electrical networks 12,14, but also might damage various components of the DC power transmission scheme, particularly as a result of high voltage stress caused by uncontrolled charging of the capacitance of the DC transmission lines 10a,10b.

One solution for preventing the accumulation of excess power is to temporarily store the excess power in DC link capacitors and other capacitors forming part of the transmitting electrical network 12. The finite energy storage capability of the transmitting electrical network 12 however limits the amount of real power that may be temporarily stored away until the receiving electrical network 14 returns to its working state.

Another solution for preventing the accumulation of excess power is the use of a load dump chopper circuit 20 to divert the excess power away from the DC transmission lines 10a,10b. FIG. 2 shows a dump resistor 22 connected in series with a switch 24 across the DC transmission lines 10a,10b. Closing the switch 24 causes current to flow from the DC transmission lines through the dump resistor 22, which in turn causes power to dissipate via the dump resistor 22. This allows excess energy to be removed from the DC transmission lines 10a,10b via the load dump chopper circuit 20.

Existing chopper circuits utilise a simple semiconductor switch to connect a resistor between the DC transmission lines in order to absorb excess energy. This type of chopper relies on the series connection and simultaneous switching of a large number of lower voltage semiconductor switches which are operated in a pulse width modulation (PWM) manner to accurately control the energy absorption. The design and operation of such a chopper circuit switch requires large passive devices and complex control methods to ensure equal sharing of the total applied voltage between the individual semiconductor switches. In addition, the PWM action leads to very high rates of change of voltage and current within the chopper circuit and DC transmission lines which leads to undesirable electrical spikes and a high level of electromagnetic noise and interference.

According to an aspect of the invention, there is provided a control circuit comprising first and second DC terminals for connection to a DC network, the first and second DC terminals having a plurality of modules and at least one energy conversion element connected in series therebetween to define a current transmission path, the plurality of modules defining a chain-link converter, each module including at least one energy storage device, the or each energy storage device being selectively removable from the current transmission path to cause a current waveform to flow from the DC network through the current transmission path and the or each energy conversion element and thereby remove energy from the DC network, the or each energy storage device being selectively removable from the current transmission path to modulate the current waveform to maintain a zero net change in energy level of the chain-link converter.

The ability to selectively remove the or each energy storage device of each module from the current transmission path has been found to allow a fast transfer of energy, i.e. excess power, from the DC network to the control circuit and thereby enables rapid regulation of the energy levels in the DC network. Such a DC network may include, but is not limited to, DC transmission lines of a DC power transmission scheme.

The modulation of the current waveform to maintain a zero net change in energy level of the chain-link converter maintains the average energy level of the chain-link converter at a constant value. This allows the individual voltage levels of the energy storage devices to be maintained at constant values before and after the operation of the control circuit to remove excess energy from the DC network. Otherwise a non-zero net change in energy level of the chain-link converter would require the use of additional bidirectional power transfer hardware to offset the increase or decrease in energy level of the chain-link converter. The use of additional bidirectional power transfer hardware however adds to the cost, size and weight of the control circuit.

To achieve a zero net change in energy level of the chain-link converter, any increase in energy level must be offset by a corresponding decrease in energy level over a single duty cycle of the control circuit. This may be achieved by selectively removing the energy storage devices from the current transmission path to construct either: a bidirectional voltage waveform across and a unidirectional current waveform through the chain-link converter; or a unidirectional voltage waveform across and a bidirectional current waveform through the chain-link converter. In either case, each energy storage device may be inserted into the current transmission path so that the current waveform flows in either forward or reverse directions through each energy storage device. This in turn allows selective real-time charging or discharging, and thereby control of the voltage level, of each energy storage device whilst the control circuit is controlled to remove excess real power from the DC network.

Such control of the voltage level of each energy storage device allows balancing of the individual voltage levels of the energy storage devices, and thereby simplifies the design of the control circuit by allowing, for example, the use of average voltage value as feedback to control selective removal of the energy storage devices from the current transmission path.

In embodiments of the invention each module may further include at least one switching element to selectively direct current through at least one energy storage device and cause current to bypass the or each energy storage device.

In such embodiments each module includes two pairs of switching elements connected in parallel with the or each energy storage device in a full-bridge arrangement to define a 4-quadrant bipolar module that can provide zero, positive or negative voltage and can conduct current in two directions.

In other such embodiments each module includes a pair of switching elements connected in parallel with the or each energy storage device in a half-bridge arrangement to define a 2-quadrant unipolar module that can provide zero or positive voltage and can conduct current in two directions.

In further such embodiments each module may include first and second sets of series-connected current flow control elements, each set of current flow control elements including a switching element to selectively direct current through the or each energy storage device and a passive current check element to limit current flow through the module to a single direction, the first and second sets of series-connected current flow control elements and the or each energy storage device being arranged in a full-bridge arrangement to define a 2-quadrant bipolar rationalised module that can provide zero, positive or negative voltage while conducting current in a single direction.

Such modules provide a reliable means of selectively removing the or each energy storage device from the current transmission path.

In embodiments employing the use of one or more switching elements at least one switching element may be or may include a semiconductor device.

In such embodiments, the or each semiconductor device may be an insulated gate bipolar transistor, a gate turn-off thyristor, a field effect transistor, an injection enhanced gate transistor or an integrated gate commutated thyristor.

Optionally at least one switching element further includes an anti-parallel diode connected in parallel with the or each corresponding semiconductor device.

The fast switching capabilities of such semiconductor devices helps the control circuit to respond quickly to changes in energy levels in the DC network, and also enables fine control over the selective removal of respective energy storage devices from the current transmission path. Moreover, the inclusion of such semiconductor devices permits the use of pulse width modulation, if desired.

Preferably the or each energy conversion element is or includes a resistor.

The resistance value may be adjusted to match the requirements of the control circuit, such as, for example, the rate of dissipation of excess energy flowing into the control circuit from the DC network.

In other embodiments of the invention the or each energy storage device may be or may include a capacitor, a battery, or a fuel cell.

A respective energy storage device may be any device that is capable of storing and releasing electrical energy to provide a voltage. This flexibility is useful in designing control circuits in different locations where the availability of equipment may be limited due to locality or transport difficulties.

In embodiments of the invention the control circuit may include a plurality of energy conversion elements connected in series with the plurality of modules.

Preferably the energy conversion elements and the modules are arranged to define an alternating sequence of energy conversion elements and modules.

Such arrangements result in a modular arrangement of the control circuit comprising a plurality of modular sections, each of which includes a module grouped with a neighbouring energy conversion element. This allows an apparatus associated with the control circuit to be divided into a plurality of modular sub-apparatus, each of which is linked to an individual modular section. Such an apparatus may be, for example, a thermal management unit. As such the control circuit is readily scalable to add or remove a modular section and its accompanying sub-apparatus without the need for substantial redesign and modification of the associated apparatus to correspond to the scale of the control circuit.

The control circuit may optionally further include a third terminal connected in series between the first and second DC terminals, the third terminal being for connection to ground, the plurality of modules including first and second sets of modules, the first set of modules being connected in series with at least one energy conversion element between the first DC terminal and the third terminal, the second set of modules being connected in series with at least one other energy conversion element between the second DC terminal and the third terminal.

Such an arrangement permits a different load to be applied to each of the first and second DC terminals connected to the DC network, if desired.

Preferably the control circuit further includes a controller to selectively remove each energy storage device from the current transmission path.

In embodiments of the invention the current waveform may include one or more current waveform components. In such embodiments the or each current waveform component may be selected from a group including, but not limited to, a half-sinusoidal current waveform component, a trapezoidal current waveform component, and higher order harmonic current waveform components.

The characteristics of the energy removed from the DC network varies with the shape of the current waveform.

It is preferred that the control circuit is capable of varying the amount of real power removed from the DC network to avoid over-voltage and under-voltage situations. This may be achieved by varying the shape of the current waveform in real-time. For example, the current waveform may be modulated to add or remove one or more current waveform components to vary the shape of the current waveform.

Optionally the current waveform is modulated to include a plurality of current pulses and add a time delay between consecutive current pulses. In such embodiments the durations of each current pulse and the time delay may be equal.

The use of a time delay in the current waveform reduces loading of the or each energy conversion element, if desired.

In other embodiments of the invention the voltage rating of the chain-link converter may be set to exceed the voltage of the DC network.

A higher voltage rating allows the chain-link converter to construct a voltage that exceeds the voltage across the DC network in order to reverse the direction of current in the current transmission path. This in turn permits the modulation of a current waveform to achieve the required zero net change in energy level of the chain-link converter in certain arrangements of the control circuit, in which the chain-link converter is capable of constructing a voltage in only one direction.

In further embodiments of the invention the or each energy storage device may be selectively removable from the current transmission path to charge one or more other energy storage devices.

This allows one or more energy storage devices to absorb real power from the DC network to offset any operating losses of the chain-link converter and thereby maintain the average energy level of the chain-link converter at a constant value without the need for additional power transfer hardware to add or remove energy.

Preferred embodiments of the invention will now be described, by way of non-limiting examples, with reference to the accompanying drawings in which:

FIGS. 5a and 5b illustrate characteristics of energy removed from the DC transmission lines using the control circuit of FIG. 2 when the current waveform flowing through the current transmission path and resistor is modulated to form a unidirectional, trapezoidal current waveform;

Figure 1A:
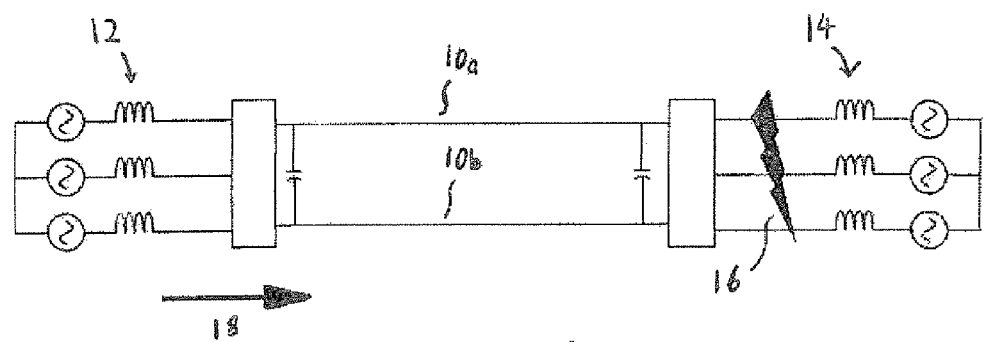
FIGS. 1a and 1b show, in schematic form, prior art DC transmission schemes.
Figure 1B:
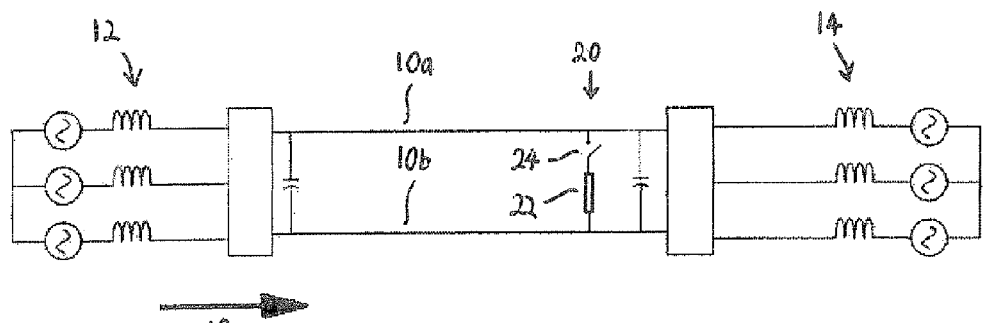
Figure 2:
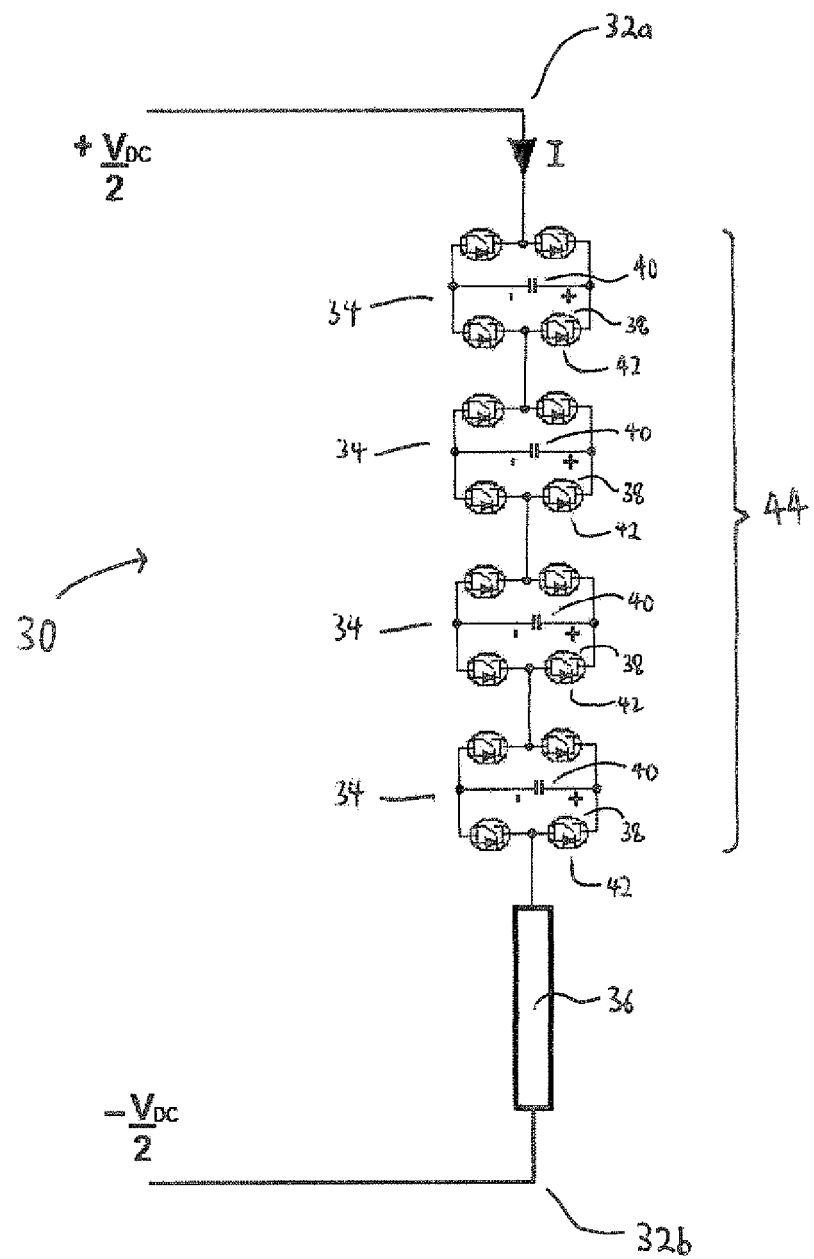
FIG. 2 shows, in schematic form, a control circuit according to a first embodiment of the invention.
Figure 8A:
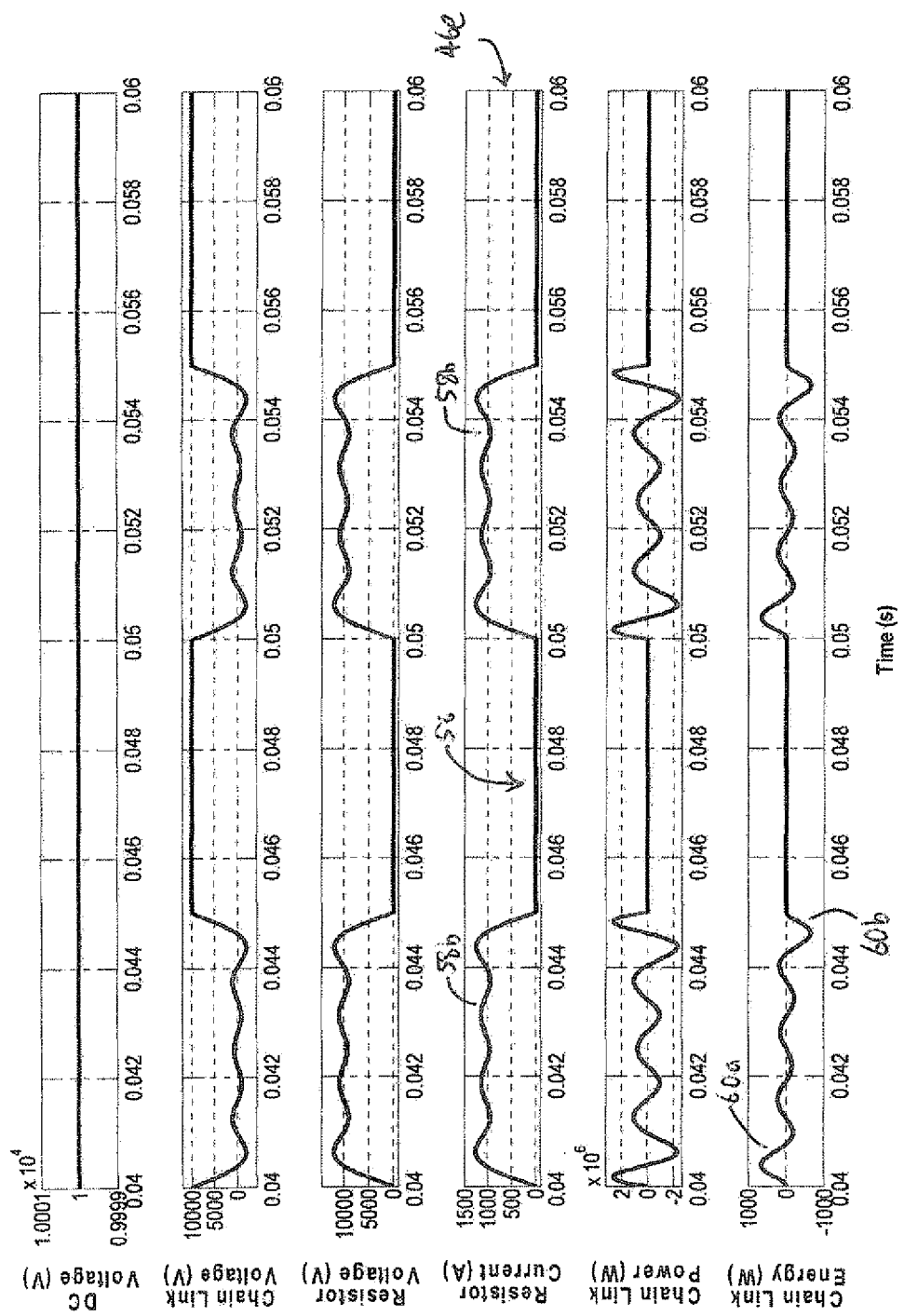
Figure 8B:
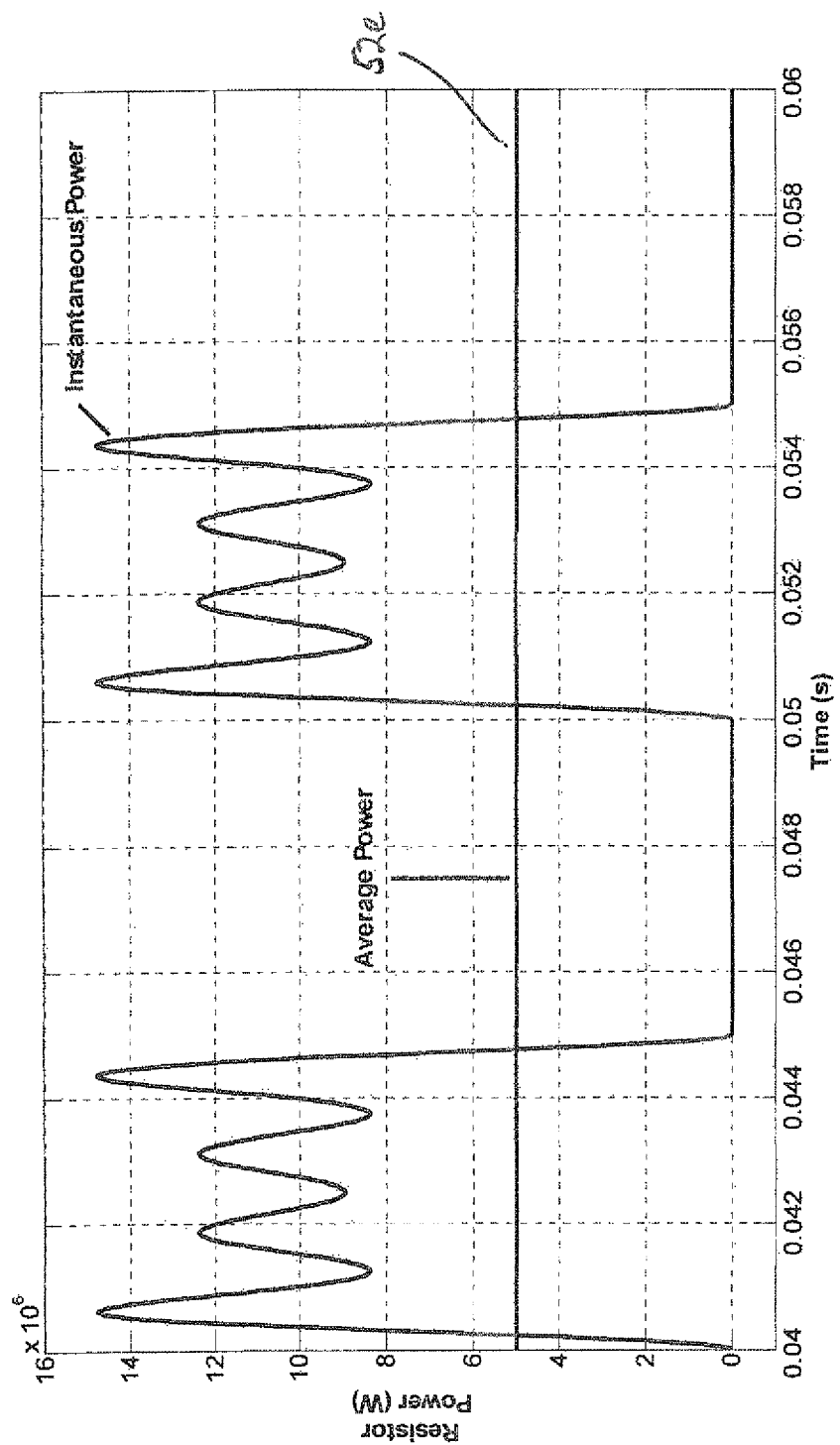
Figure 9A:
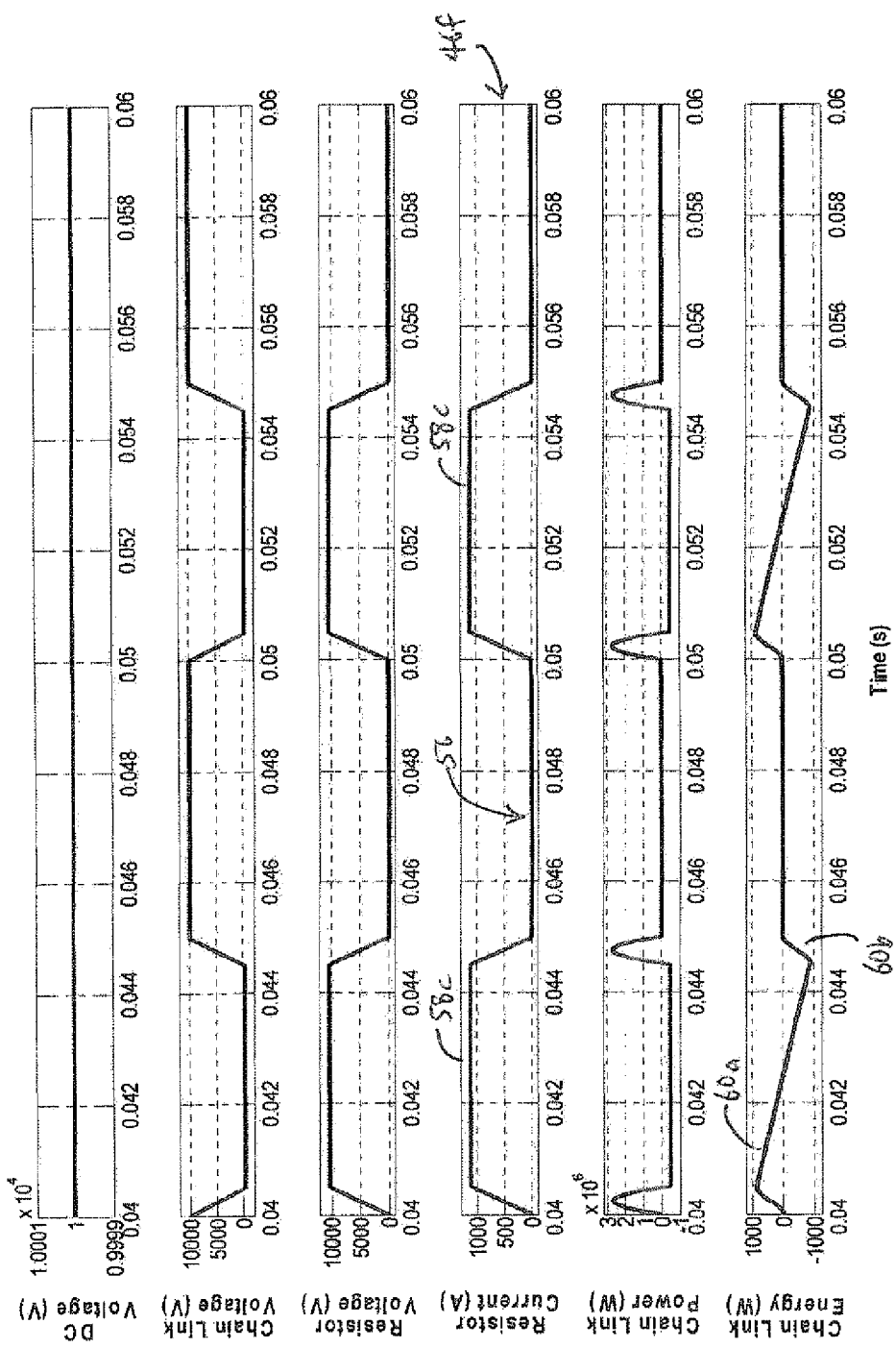
Figure 9B:
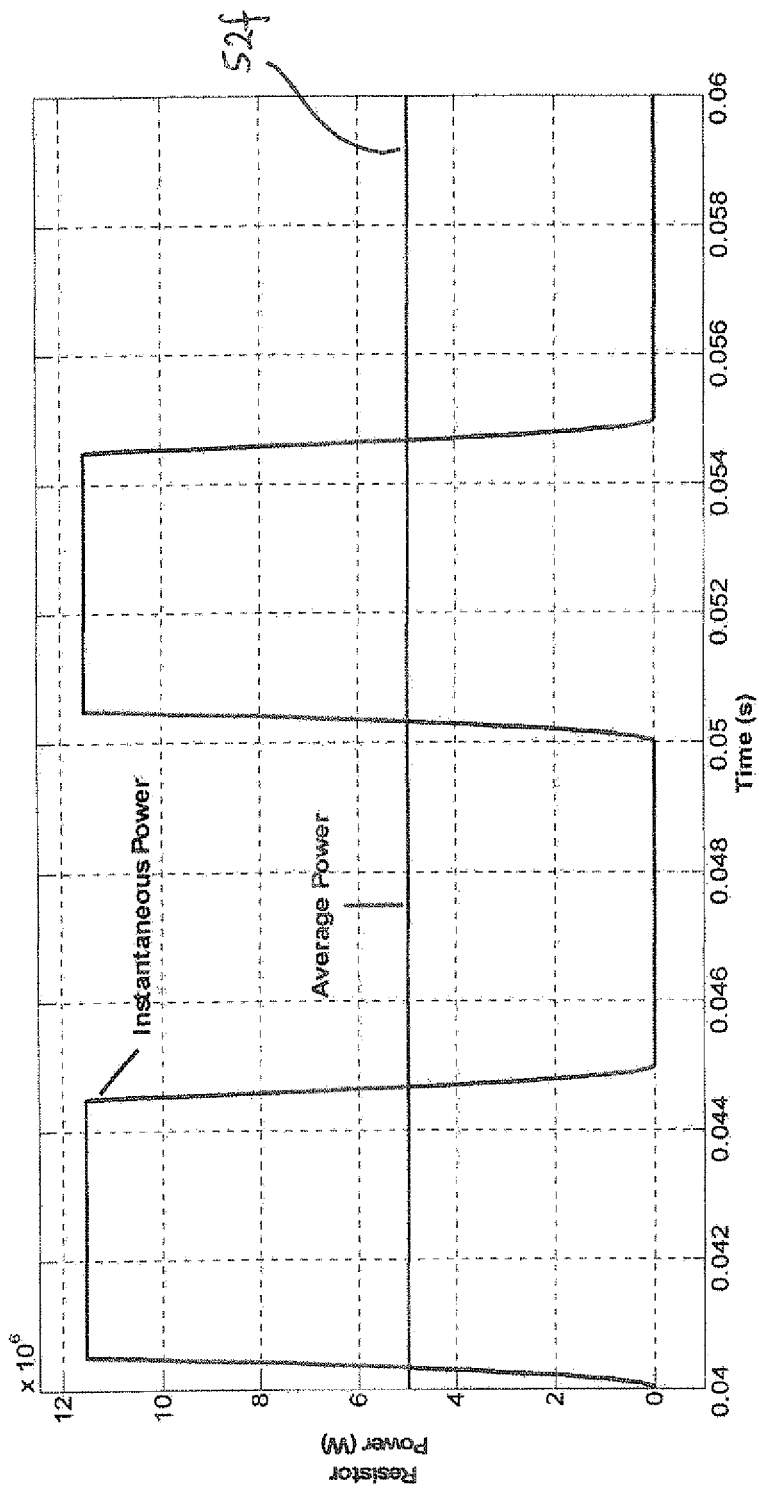
Figure 10:
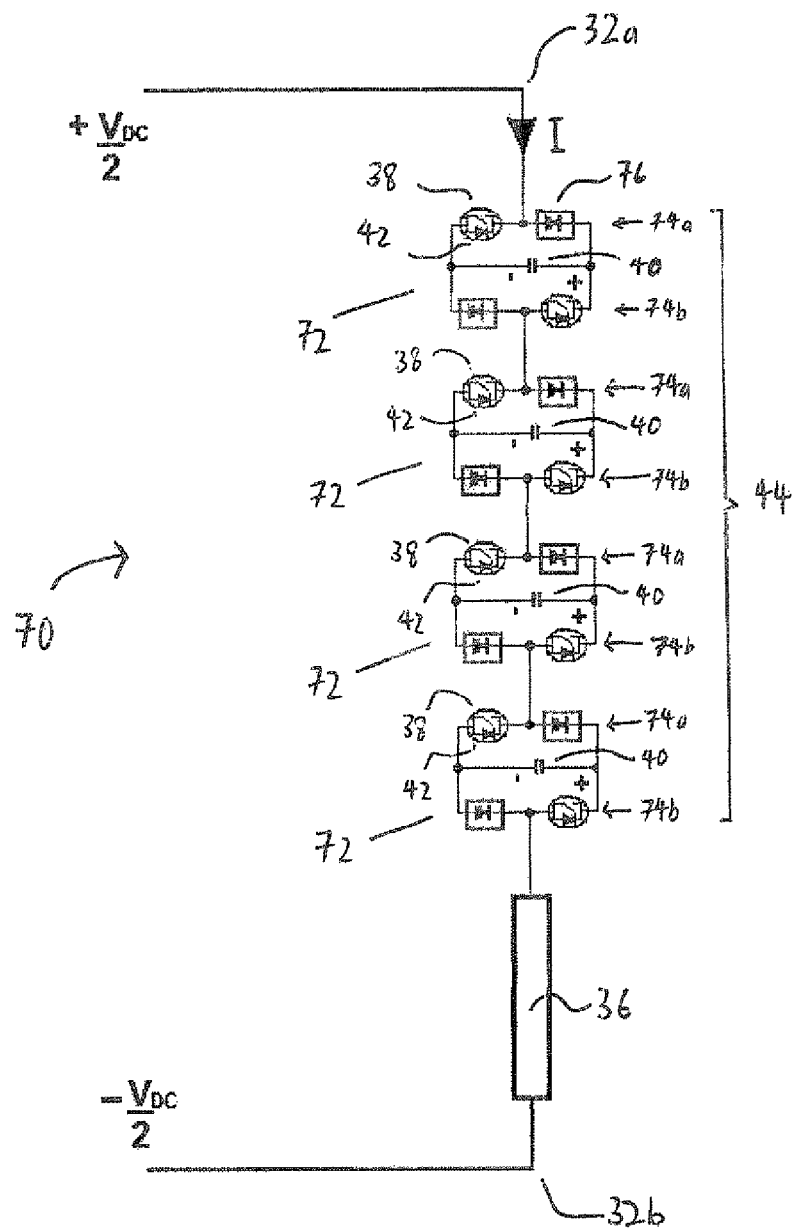
Figure 11:
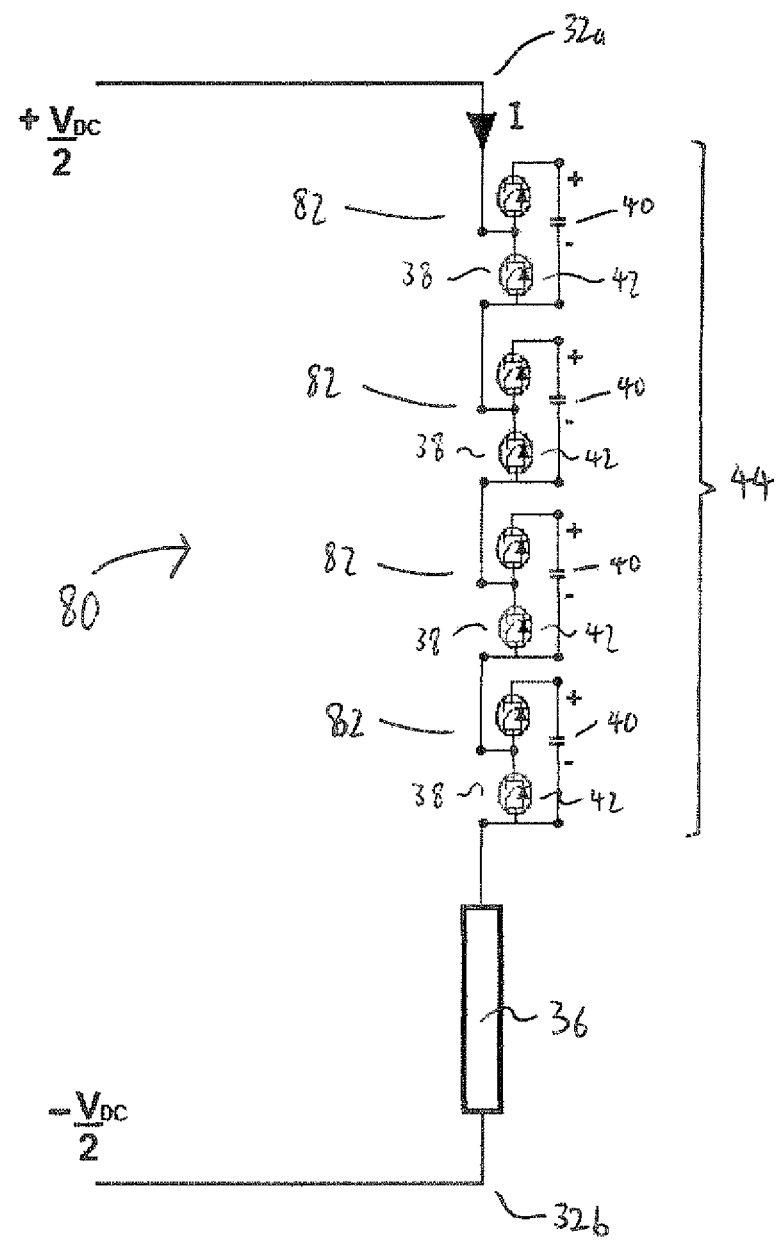
Figure 12A:
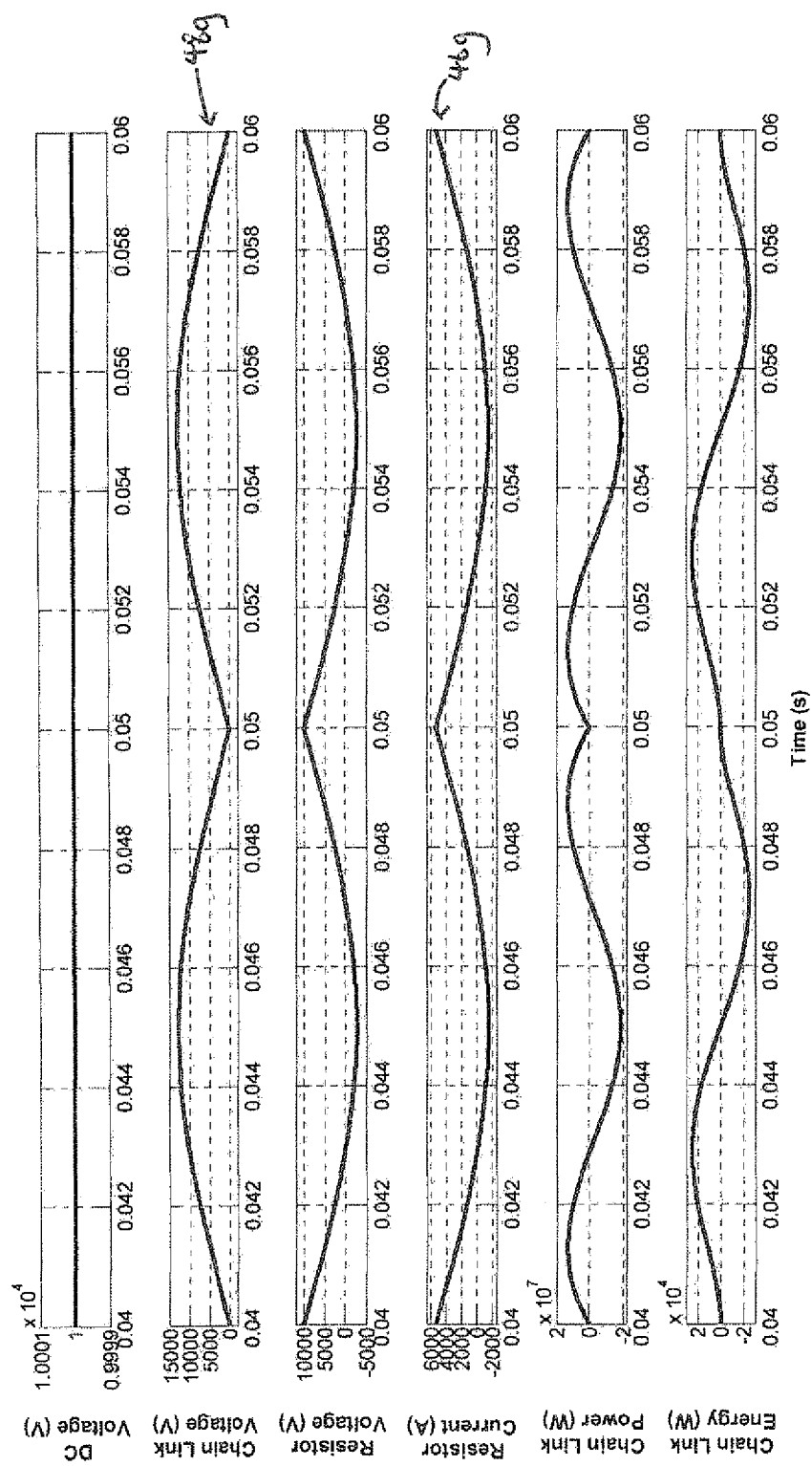
Figure 12B:
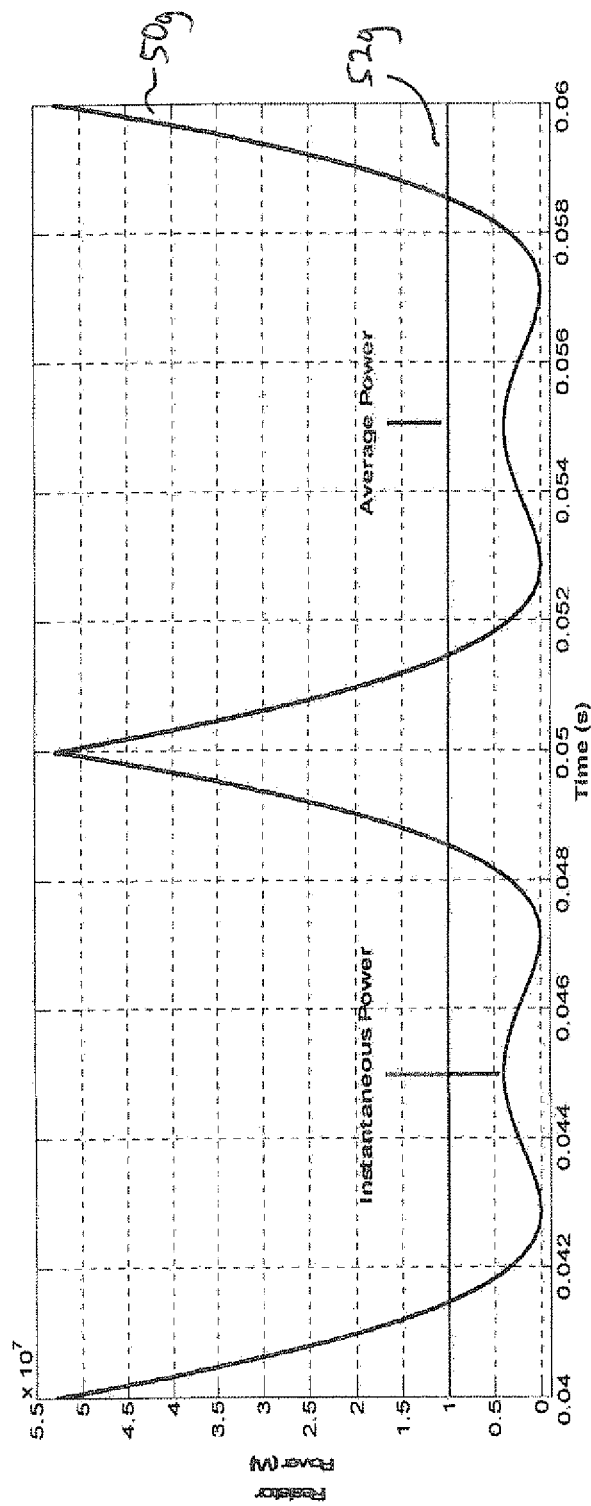
Figure 13A:
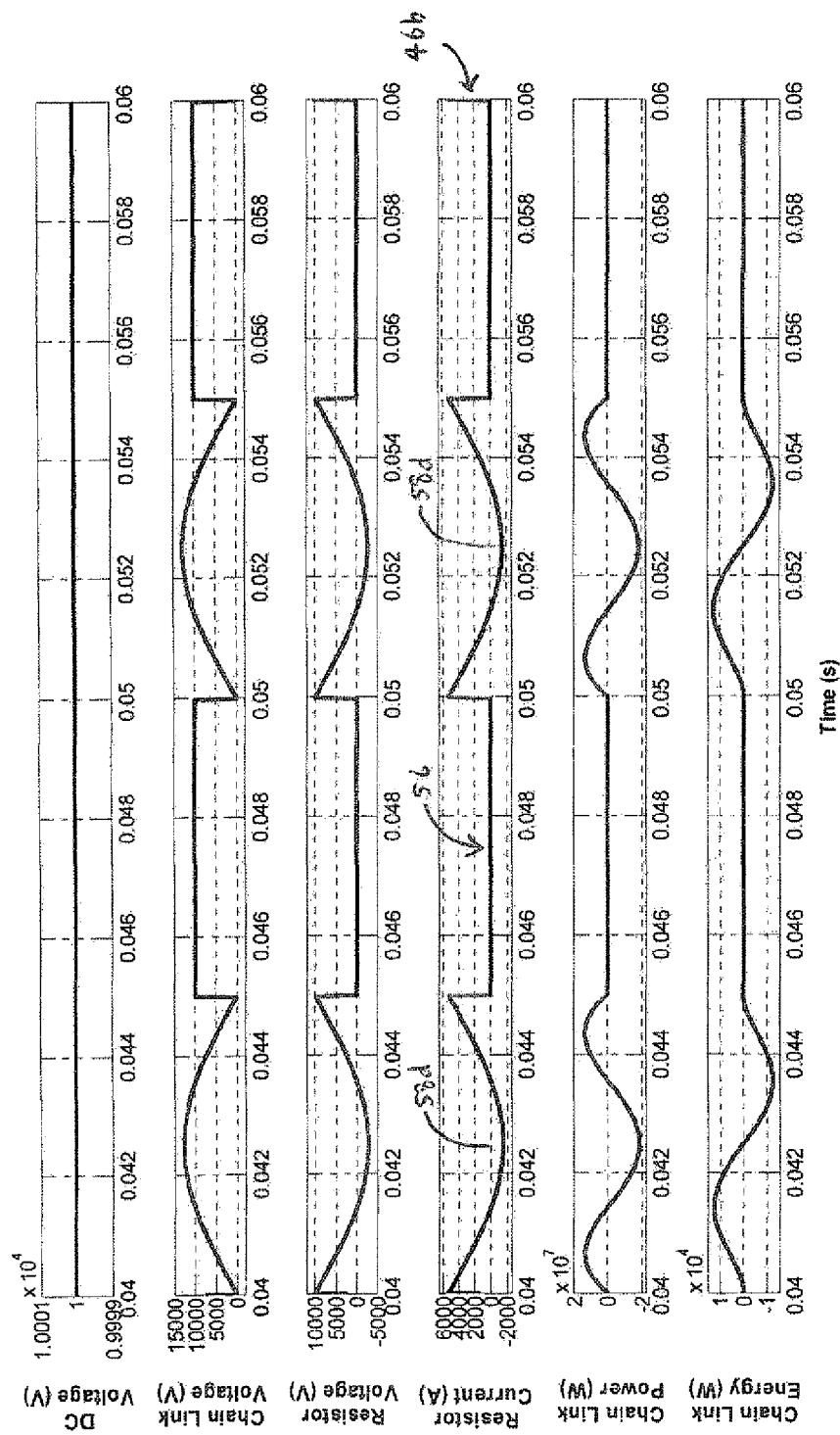
Figure 13B:
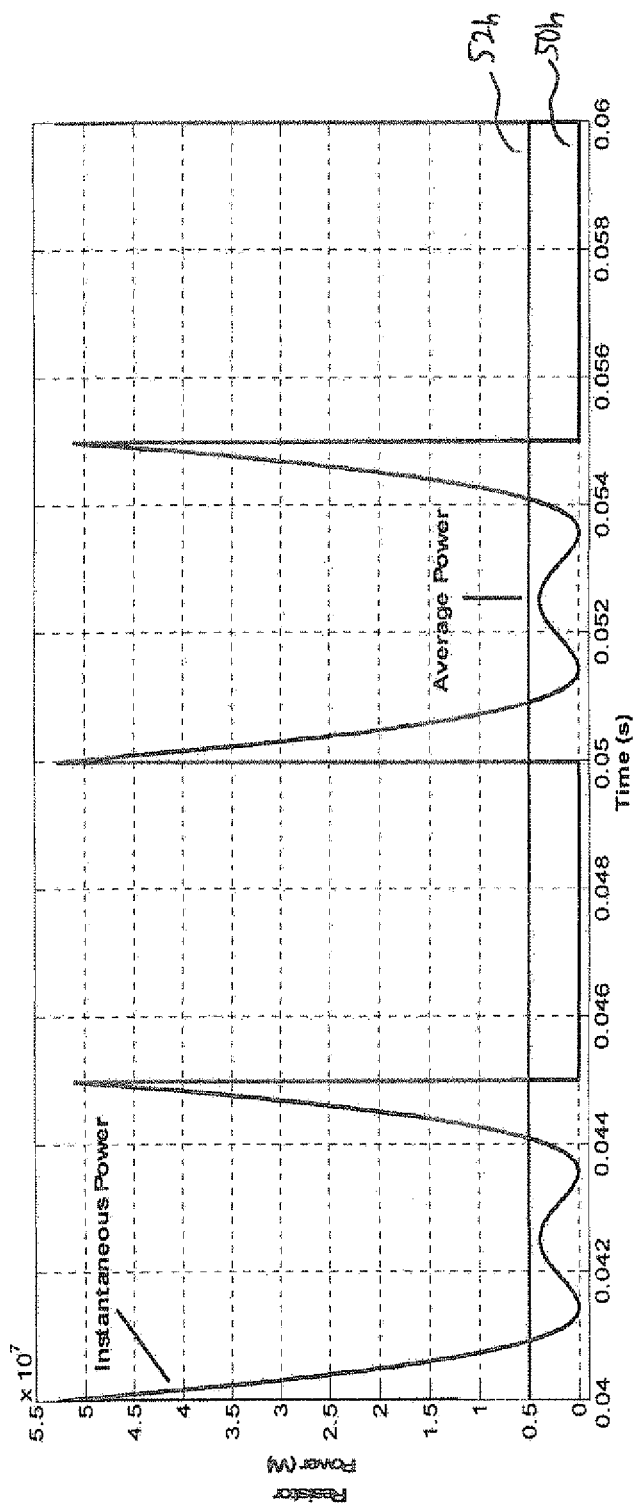
Figure 14:
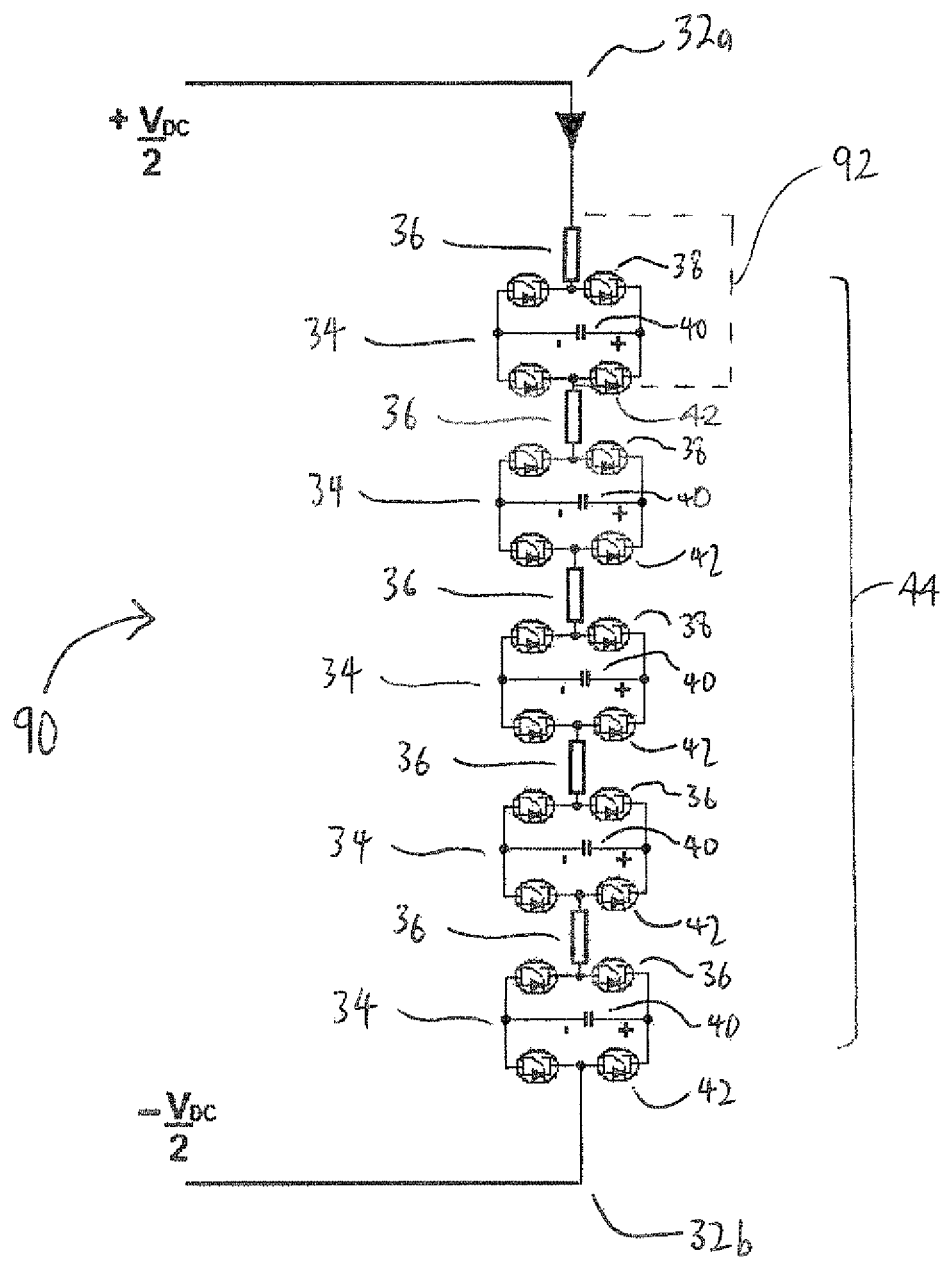
Figure 15:
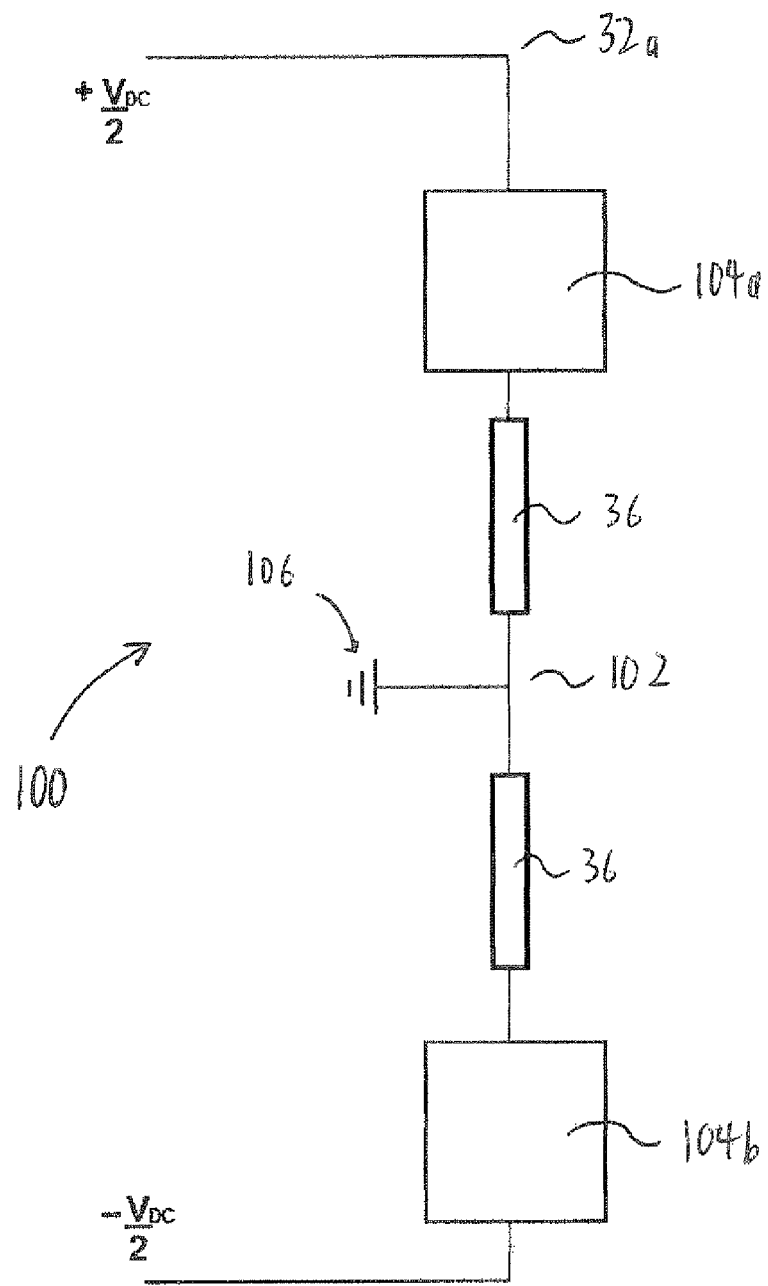

FIGS. 8a and 8b illustrate characteristics of energy removed from the DC transmission lines using the control circuit of FIG. 2 when the current waveform flowing through the current transmission path and resistor is modulated to add a time delay between consecutive current pulses, where each current pulse includes a half-sinusoidal current component and $3^{rd}$, $5^{th}$ and 7th higher order harmonic current components;

FIGS. 9a and 9b illustrate characteristics of energy removed from the DC transmission lines using the control circuit of FIG. 2 when the current waveform flowing through the current transmission path and resistor is modulated to add a time delay between consecutive trapezoidal current pulses;

FIGS. 10 and 11 show, in schematic form, a control circuit according to second and third embodiments of the invention respectively;

FIGS. 12a and 12b illustrate characteristics of energy removed from the DC transmission lines using the control circuit of FIG. 11 when the current waveform flowing through the current transmission path and resistor is modulated to form a bidirectional, half-sinusoidal current waveform;

FIGS. 13a and 13b illustrate characteristics of energy removed from the DC transmission lines using the control circuit of FIG. 11 when the current waveform flowing through the current transmission path and resistor is modulated to add a time delay between consecutive half-sinusoidal current pulses;

FIGS. 14 and 15 show, in schematic form, a control circuit according to fourth and fifth embodiments of the invention respectively.

A control circuit 30 according to a first embodiment of the invention is shown in FIG. 2.

The first control circuit 30 comprises first and second DC terminals 32a,32b.

In use, the first DC terminal 32a is connected to a first DC transmission line (not shown) that is at a positive voltage, +$V_{DC}$/2, while the second DC terminal 32b is connected to a second DC transmission line (not shown) that is at a negative voltage, −$V_{DC}$/2.

The first control circuit 30 further includes a plurality of modules 34 that are connected in series with a resistor 36 between the first and second DC terminals 32a,32b to define a current transmission path. The resistor 36 is connected between the plurality of series-connected modules 34 and the second DC terminal 32b.

Optionally the resistor 36 may be connected between the plurality of series-connected modules 34 and the first DC terminal 32a.

Each module 34 includes two pairs of switching elements 38 connected in parallel with an energy storage device in the form of a capacitor 40. The switching elements 38 and the capacitor 40 are connected in a full-bridge arrangement which defines a 4-quadrant bipolar module 34 that can provide a negative, zero or positive voltage and can conduct current in two directions The capacitor 40 of each module 34 may be selectively removed from the current transmission path, i.e. switched in or out of circuit with the resistor 36, by changing the state of the switching elements 38. This allows the current in the first control circuit 30 to selectively flow through or bypass each capacitor 40.

The capacitor 40 is removed from the current transmission path, i.e. switched out of circuit with the resistor 36, when the pairs of switching elements 38 are configured to form a short circuit in the module 34. This causes the current in the first control circuit 30 to pass through the short circuit and bypass the capacitor 40. Such a configuration allows the module 34 to provide a zero voltage.

The capacitor 40 of each module 34 is returned to the current transmission path, i.e. switched back into circuit with the resistor 36, when the pairs of switching elements 38 are configured to allow the current in the first control circuit 30 to flow into and out of the capacitor 40. The capacitor 40 is then able to charge or discharge its stored energy and provide a voltage. The bidirectional nature of the 4-quadrant bipolar module 34 means that the capacitor 40 may be inserted into the 4-quadrant bipolar module 34 in either forward or reverse directions so as to provide a positive or negative voltage.

It is envisaged that the two pairs of switching elements 38 may be replaced by other configurations that are capable of selectively removing a corresponding energy storage device, e.g. a capacitor, from the current transmission path in the aforementioned manner.

Each switching element 38 includes an insulated gate bipolar transistor connected in parallel with an anti-parallel diode 42. In other embodiments each switching element 38 may include a gate turn-off thyristor, a field effect transistor, an injection enhanced gate transistor or an integrated gate commutated thyristor, or other force-commutated or self-commutated semiconductor switches.

The size of the capacitor 40 of each module 34 may be reduced by switching the switching elements 38 at high frequencies, if desired. For example, when the DC transmission lines are operated at 100's of MW, the switching elements 38 of each module 34 may be switched at frequencies up to 500 Hz. This in turn reduces the size, weight and cost of the first control circuit 30.

In still further embodiments each capacitor 40 may be replaced by another energy storage device such as a battery, or a fuel cell, or any device that is capable of storing and releasing electrical energy to provide a voltage.

The plurality of series-connected modules 34 defines a chain-link converter 44. It is possible to build up a combined voltage across the chain-link converter 44, which is higher than the voltage available from each individual module 34, via the insertion of the capacitors 40 of multiple modules 34, each providing its own voltage, into the chain-link converter 44.

In this manner switching of the switching elements 38 of each 4-quadrant bipolar module 34 causes the chain-link converter 44 to provide a stepped variable voltage source, which permits the generation of a voltage waveform across the chain-link converter 44 using a step-wise approximation.

The first control circuit 30 further includes a controller (not shown), which switches the switching elements 38 in each module 34 to selectively remove the corresponding capacitor 40 from the current transmission path.

The operation of the first control circuit 30 shown in FIG. 2 within a DC power transmission scheme is described below.

First and second DC transmission lines interconnect first and second power converters that are themselves connected to respective phases of corresponding first and second AC networks (not shown). Power is transmitted from the first AC network to the second AC network via the corresponding power converters and the first and second DC transmission lines.

During normal operation the first control circuit 30 adopts a standby configuration in which the capacitor 40 of each module 34 is connected in the current transmission path, i.e. switched into circuit with the resistor 36.

The total voltage across the modules 34 is approximately equal to $V_{DC}$, which is the voltage across the DC transmission lines. In this configuration there is zero or minimal current flowing through the current transmission path, i.e. through the resistor 36 and the modules 34.

In the event that the second power converter is unable to receive the transmitted power as a result of, for example, a fault in the second AC network, the first AC network must temporarily continue transmitting power into the DC transmission lines until the power transfer can be reduced to zero, which is typically 1-2 seconds for a wind generation plant.

In order to allow the first AC network to continue transmitting power into the DC transmission lines via the first power converter, the controller selectively removes one or more capacitors 40 from the current transmission path. This results in the generation of a voltage waveform across the chain-link converter 44, which adds or subtracts finite voltage steps to the voltage across the DC transmission lines, $V_{DC}$. This in turn imposes a voltage waveform across the resistor 36 and thereby causes a current waveform to flow from the DC transmission lines through the current transmission path and the resistor 36.

Selective removal of each capacitor 40 from the current transmission path is carried out in accordance with Equation 1 to modulate the current waveform to maintain a zero net change in energy level of the chain-link converter 44 over each duty cycle of the first control circuit 30. Modulating the current waveform in this manner offsets any increase in energy level with a corresponding decrease in energy level in each duty cycle of the first control circuit 30, and vice versa.

$$P_{net} = \int_0^t (V_{CL} \times I_R) = 0 \quad (1)$$

Where
$P_{net}$ is the net exchange of energy with the chain-link converter 44
$V_{CL}$ is the voltage across the chain-link converter 44
$I_R$ is the current flowing through the resistor 36 and chain-link converter 44
t is the duration of each duty cycle of the first control circuit 30

The flow of current through the resistor 36 enables excess energy in the DC transmission lines to be transferred to the first control circuit 30 and dissipated via the resistor 36. The energy levels in the DC transmission lines are therefore regulated which helps to ensure power balance between each of the first and second AC networks and the first control circuit 30.

The current waveform is modulated to form different shapes to vary characteristics of energy removed from the DC transmission lines, whilst maintaining a zero net change in energy level of the chain-link converter 44 over each duty cycle of the first control circuit 30. Such characteristics include, but are not limited to, current flowing from the DC transmission lines through the current transmission path and resistor 36, and amount of energy and power dissipated via the resistor 36.

The current waveform may be modulated to form different shapes by including one or more current components having different current characteristics.

Figure 3A:
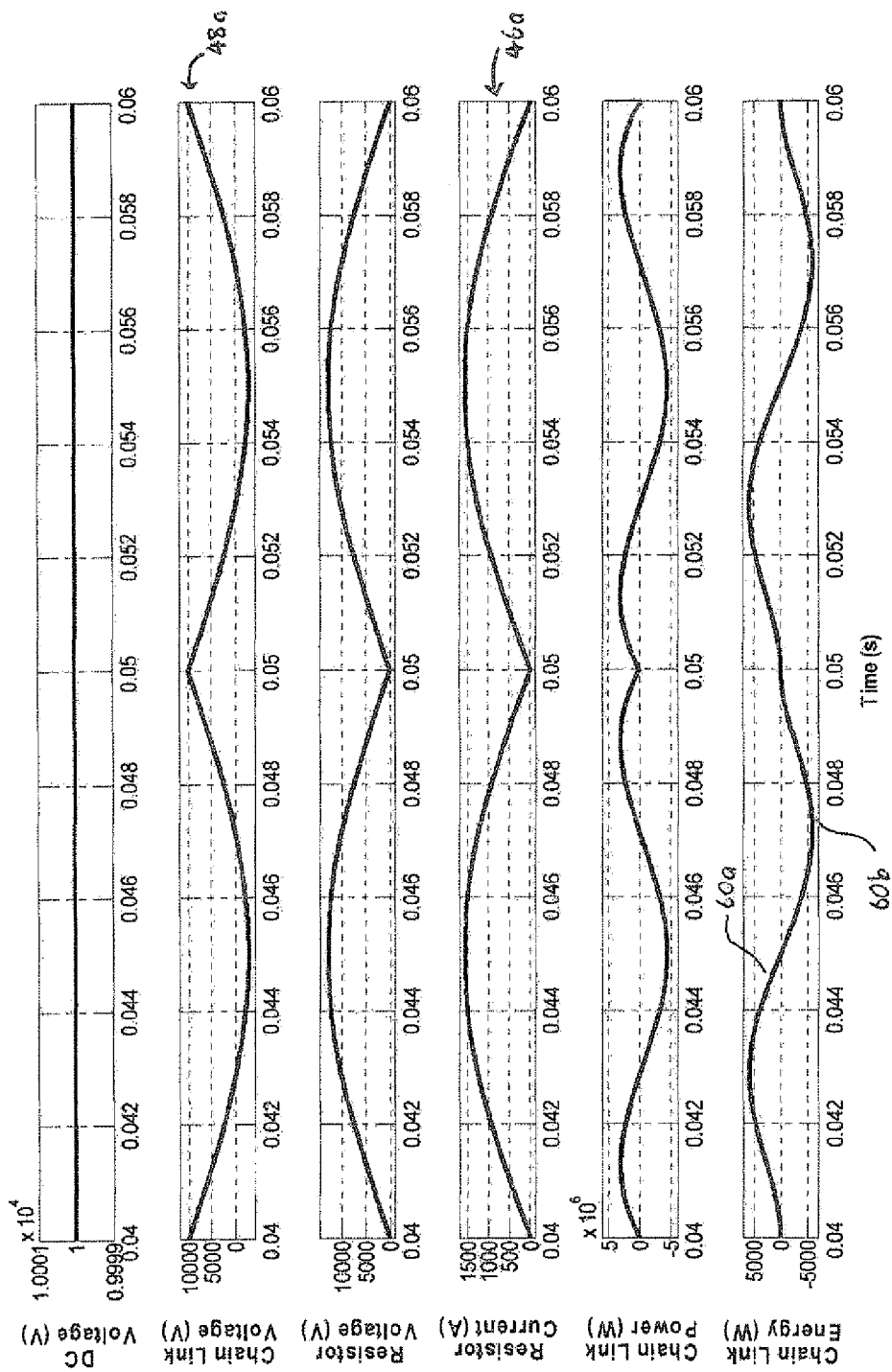
FIGS. 3a and 3b illustrate characteristics of energy removed from the DC transmission lines using the control circuit of FIG. 2 when the current waveform flowing through the current transmission path and resistor is modulated to form a unidirectional, half-sinusoidal current waveform.
Figure 3B:
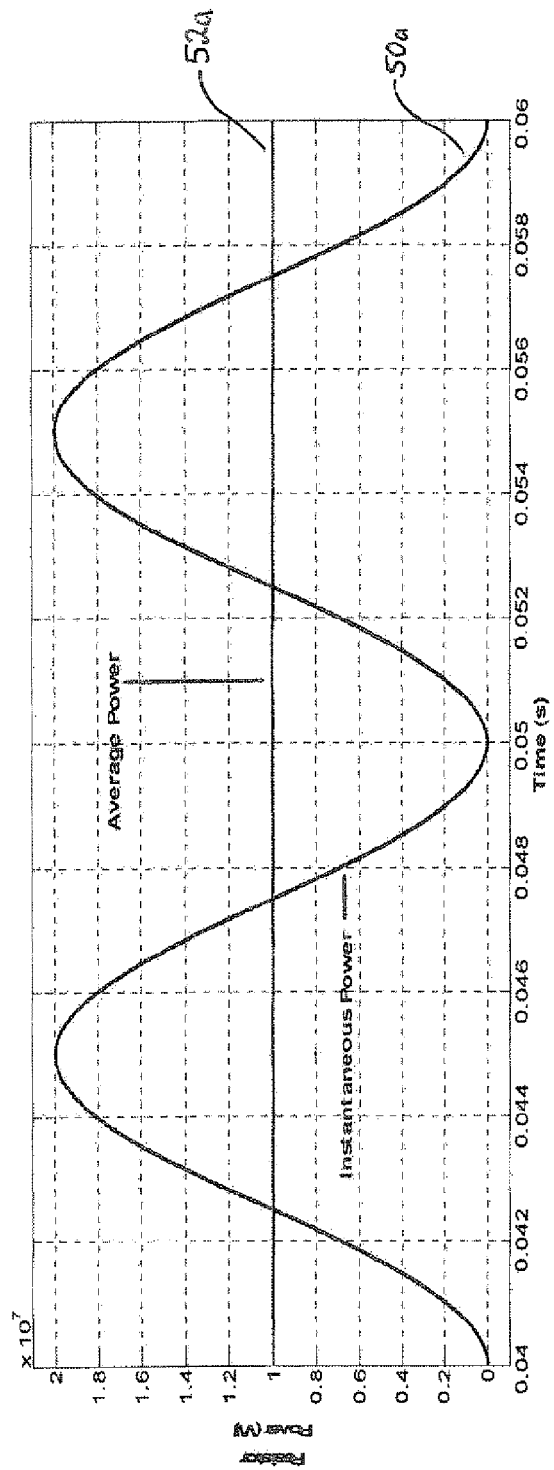

FIGS. 3a and 3b illustrate the characteristics of energy removed from the DC transmission lines using the first control circuit 30 of FIG. 2 when the current waveform flowing through the current transmission path and resistor 36 is modulated to form a unidirectional, half-sinusoidal current waveform 46a.

In order to form such a current waveform 46a, the controller selectively removes each capacitor 40 from the current transmission path to generate a bidirectional, half-sinusoidal voltage waveform 48a across the chain-link converter 44. Accordingly this causes a unidirectional, half-sinusoidal current waveform 46a to flow from the DC transmission lines through the current transmission path and the resistor 36, which in turn causes power to be dissipated via the resistor 36.

FIG. 3b illustrates the corresponding instantaneous power 50a and average power 52a dissipated via the resistor 36 over each duty cycle of the first control circuit 30. The instantaneous power 50a dissipated via the resistor 36 during each duty cycle is given by the product of the instantaneous current flowing through the resistor 36 and the instantaneous voltage across the resistor 36. The average power 52a dissipated via the resistor 36 is given by the product of the average current flowing through the resistor 36 and the average voltage across the resistor 36. It is shown that when $V_{DC}$ is 10 kV, the average power 52a dissipated via the resistor 36 is 10 MW.

For the half-sinusoidal current waveform 46a, the average current flowing through the resistor 36 is given by the product of $2/\pi$ and the peak current flowing through the resistor 36. Thus, when $V_{DC}$ is 10 kV and the average current flowing through the resistor 36 is 1 kA, the peak current flowing through the resistor 36 is 1.57 kA.

Figure 4A:
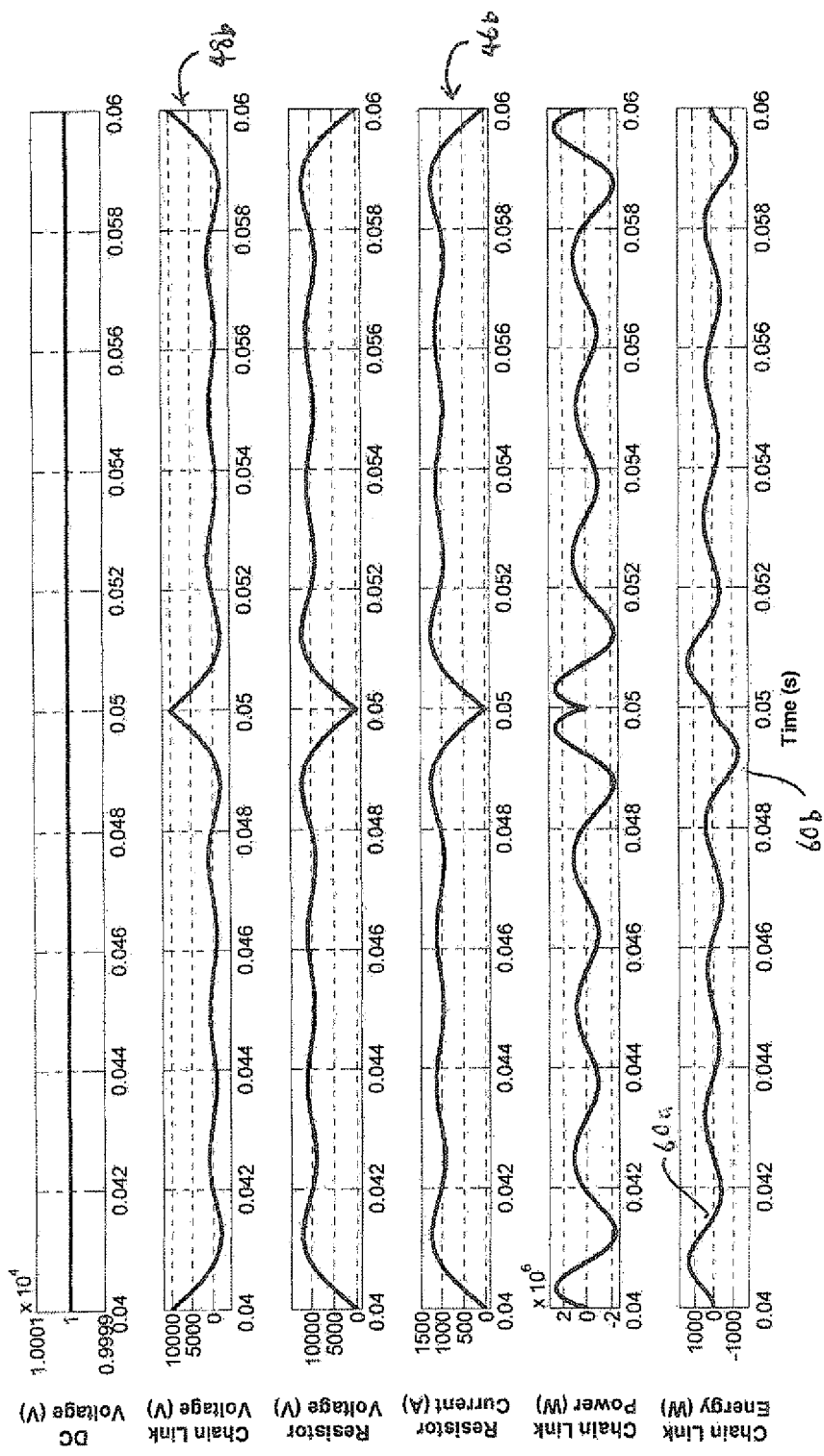
FIGS. 4a and 4b illustrate characteristics of energy removed from the DC transmission lines using the control circuit of FIG. 2 when the current waveform flowing through the current transmission path and resistor is modulated to add higher order harmonic components to a unidirectional, half-sinusoidal current waveform.
Figure 4B:
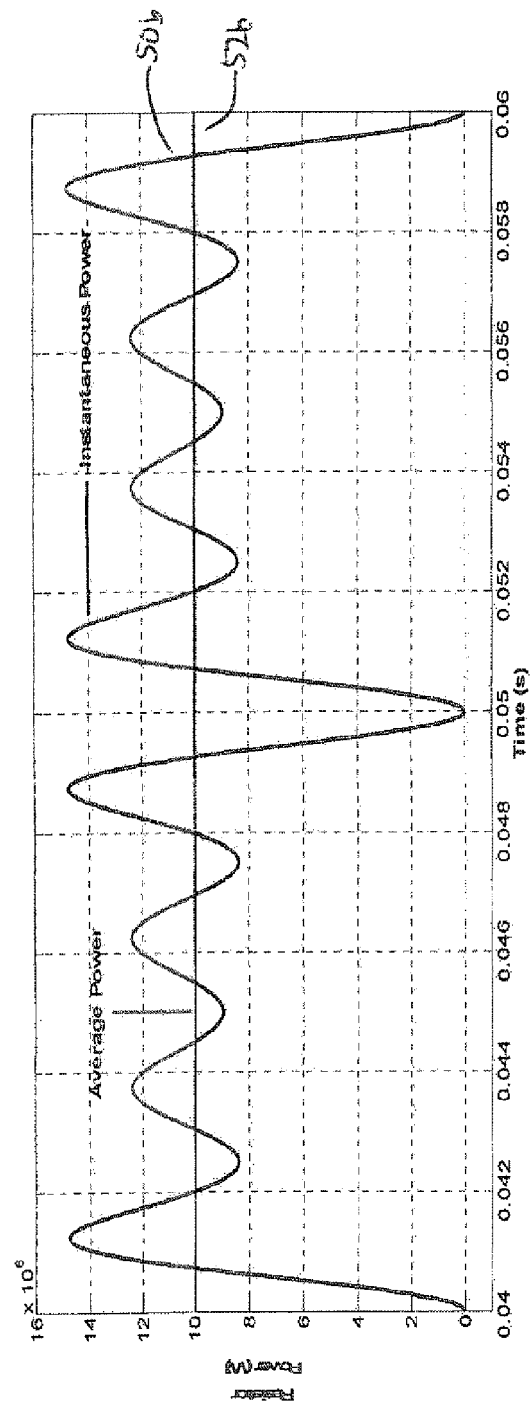

FIGS. 4a and 4b illustrate the characteristics of energy removed from the DC transmission lines using the first control circuit 30 of FIG. 2 when the current waveform 46b flowing through the current transmission path and resistor 36 is modulated to add higher order harmonic components to a unidirectional, half-sinusoidal current waveform.

In order to form such a current waveform 46b, the controller selectively removes each capacitor 40 from the current transmission path to generate a bidirectional voltage waveform 48b across the chain-link converter 44, where the voltage waveform 48b includes a half-sinusoidal voltage component and its corresponding $3^{rd}$, $5^{th}$ and $7^{th}$ harmonic voltage components. Accordingly this causes a unidirectional, harmonically modulated current waveform 46b to flow from the DC transmission lines through the current transmission path and the resistor 36, where the current waveform 46b includes a half-sinusoidal current component together with its corresponding $3^{rd}$, $5^{th}$ and $7^{th}$ harmonic current components, and thereby causes power to be dissipated via the resistor 36.

FIG. 4b illustrates the corresponding instantaneous power 50b and average power 52b dissipated via the resistor 36 over each duty cycle of the first control circuit 30. It is shown that, when $V_{DC}$ is 10 kV, the average power 52b dissipated via the resistor 36 remains unchanged, i.e. the average power 52b dissipated via the resistor 36 is 10 MW. The current waveform 46b flowing through the resistor 36 however has a lower peak current of 1.24 kA flowing through the resistor 36 when compared to the half-sinusoidal current waveform 46a.

Figure 5B:
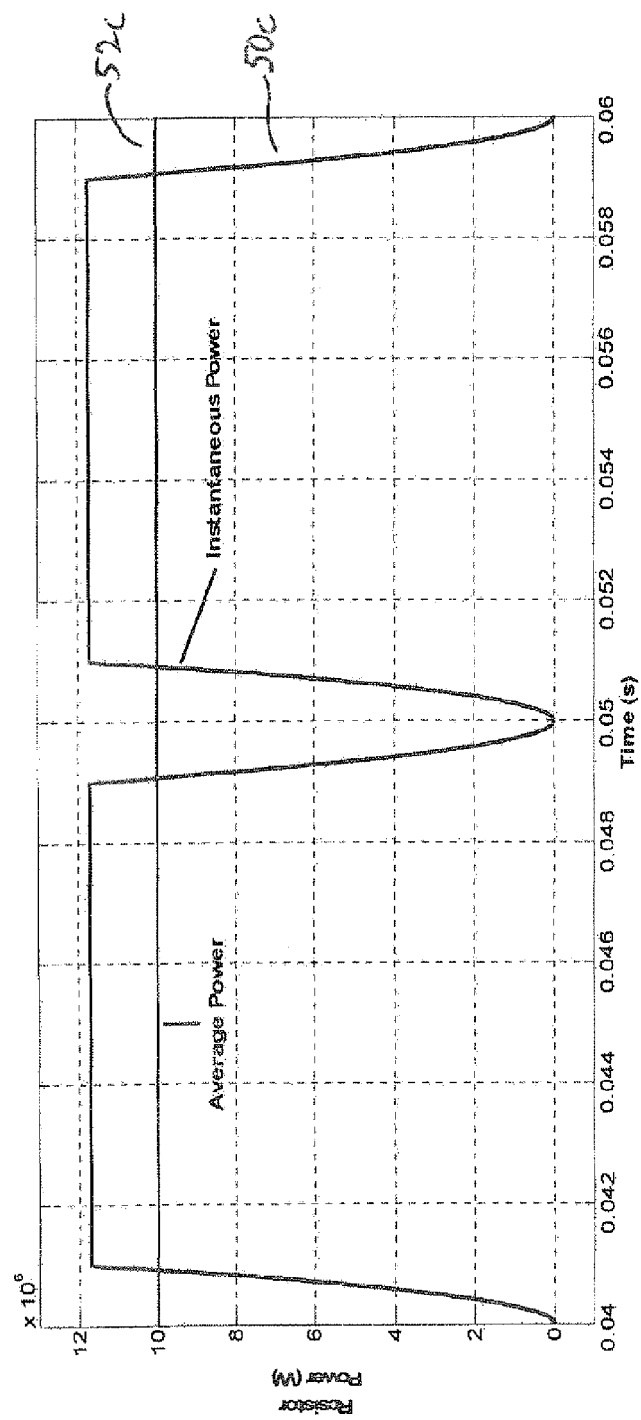

FIGS. 5a and 5b illustrate the characteristics of energy removed from the DC transmission lines using the first control circuit 30 of FIG. 2 when the current waveform flowing through the current transmission path and resistor 36 is modulated to form a unidirectional, trapezoidal current waveform 46c.

In order to form such a current waveform 46c, the controller removes each capacitor 40 from the current transmission path to generate a bidirectional, trapezoidal voltage waveform 48c across the chain-link converter 44. Accordingly this causes a unidirectional, trapezoidal current waveform 46c to flow from the DC transmission lines through the current transmission path and the resistor 36, and thereby causes power to be dissipated via the resistor 36.

FIG. 5b illustrates the corresponding instantaneous power 50c and average power 52c dissipated via the resistor 36 over each duty cycle of the first control circuit 30. It is shown that, when $V_{DC}$ is 10 kV, the average power 52c dissipated via the resistor 36 remains unchanged, i.e. the average power 52c dissipated via the resistor 36 is 10 MW. The current waveform 46c flowing through the resistor 36 has a lower peak current of 1.11 kA flowing through the resistor 36 when compared to the half-sinusoidal and harmonically modulated current waveforms 46a,46b.

The modulation of the current waveform to form a either harmonically modulated or trapezoidal waveform 46b,46c therefore results in a lower peak current to average current ratio when compared to the half-sinusoidal current waveform 46a, without affecting the amount of energy and power removed from the DC transmission lines. This has the benefit of reducing the current rating required of the first control circuit 30.

Figure 6:
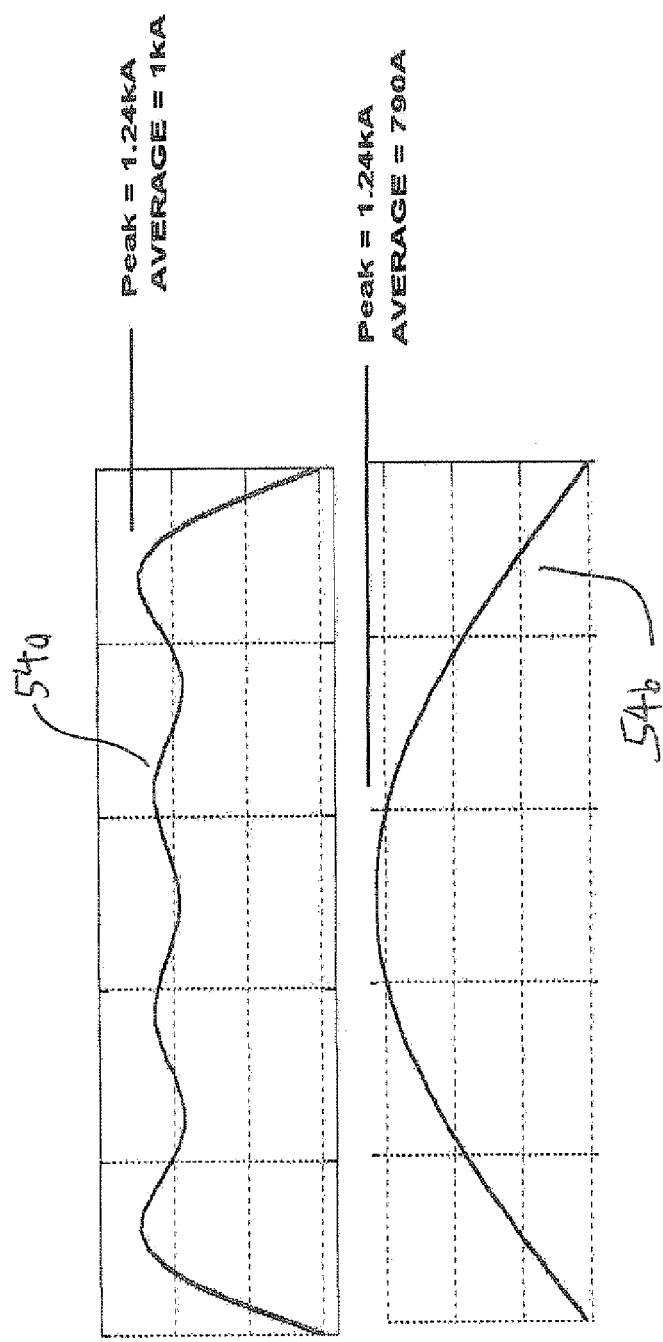
FIG. 6 illustrates the modulation of the current waveform flowing through the current transmission path and resistor to vary its shape during the removal of energy from the DC transmission lines using the control circuit of FIG. 2.

FIG. 6 illustrates the modulation of the current waveform flowing through the current transmission path and resistor 36 to vary its shape during the removal of energy from the DC transmission lines using the first control circuit 30 of FIG. 2.

As described above with reference to FIGS. 4a and 4b, when $V_{DC}$=10 kV, harmonically modulating the current waveform to add higher order harmonic components to a half-sinusoidal current waveform results in a peak current of 1.24 kA flowing through the resistor 36, an average current of 1 kA flowing through the resistor 36, and 10 MW of average power 52b dissipated via the resistor 36.

The shape of the current waveform is varied when the controller selectively removes one or more capacitors 40 from the current transmission path to modulate the harmonically modulated current waveform 54a by removing the higher order harmonic components to form a half-sinusoidal current waveform 54b flowing through the resistor 36 with a peak current of 1.24 kA. This in turn causes the average current flowing through the resistor 36 to reduce to 790 A and the average power dissipated via the resistor 36 to reduce to 7.9 MW.

Thus, for a given current rating of the chain-link converter 44, the current waveform may be modulated to add or remove one or more current components to change its shape and vary the average power dissipated via the resistor 36 in real-time. The first control circuit 30 is thus able to vary the amount of real power removed from the DC transmission lines in response to real-time changes in power levels of the DC transmission scheme to avoid over-voltage and under-voltage situations.

Optionally the current waveform flowing through the current transmission path and resistor 36 may be modulated to include a plurality of current pulses and add a time delay between consecutive current pulses.

FIGS. 7 to 9 illustrate the characteristics of energy removed from the DC transmission lines using the first control circuit 30 of FIG. 2 when the current waveform 46d,46e,46f flowing through the current transmission path and resistor 36 is modulated to add a time delay 56 between consecutive current pulses 58a,58b,58c so that the durations of each current pulse 58a,58b,58c and each time delay 56 are equal, i.e. a 50:50 duty cycle ratio.

In further embodiments it is envisaged that the durations of each current pulse 58a,58b,58c and each time delay 56 may be changed to define a different duty cycle ratio.

Figure 7A:
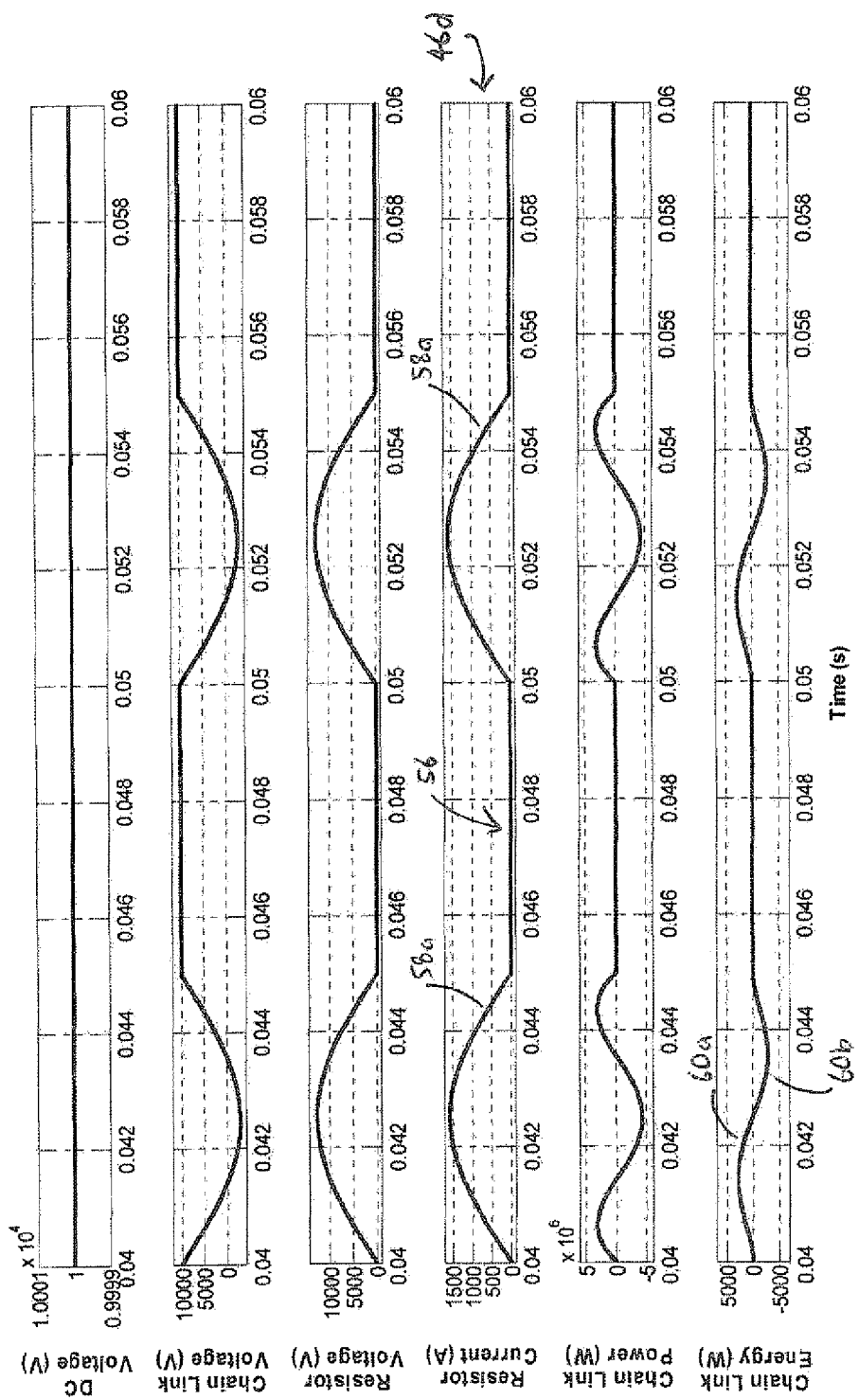
FIGS. 7a and 7b illustrate characteristics of energy removed from the DC transmission lines using the control circuit of FIG. 2 when the current waveform flowing through the current transmission path and resistor is modulated to add a time delay between consecutive half-sinusoidal current pulses.
Figure 7B:
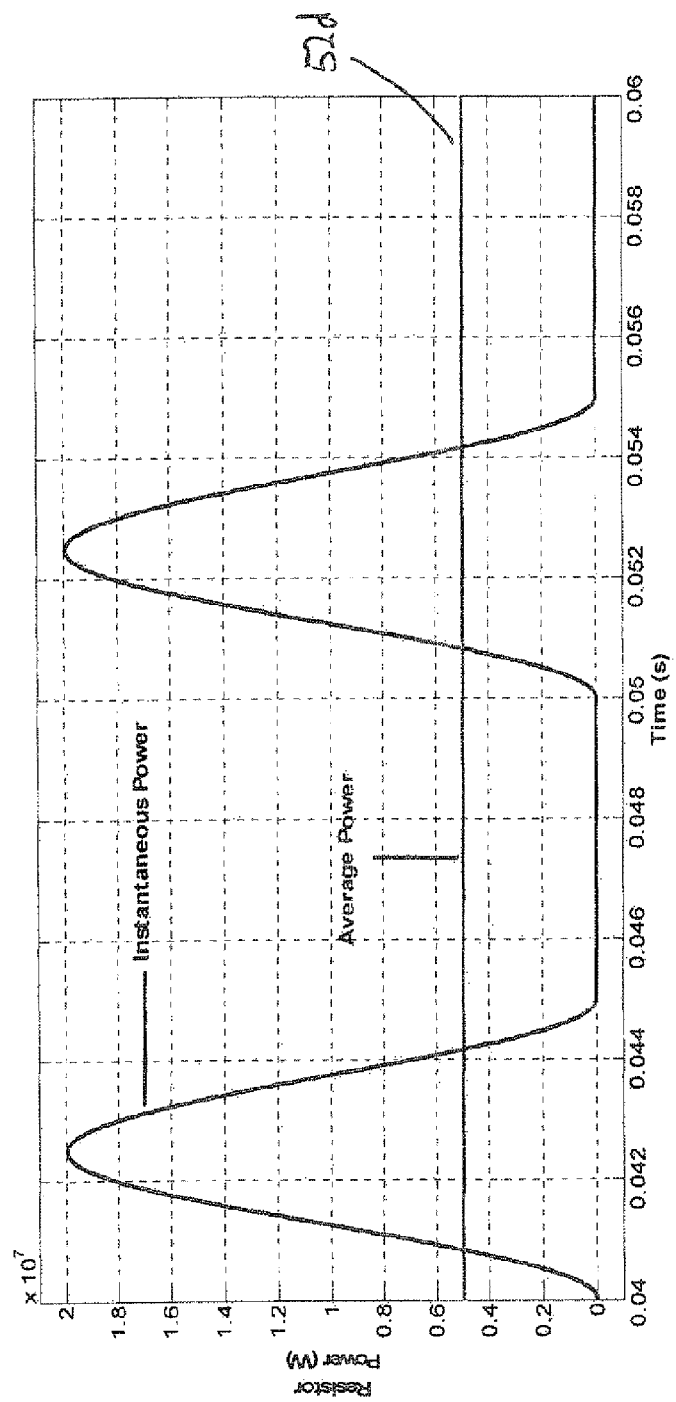

Each current pulse 58a in FIG. 7a and each resultant power pulse in FIG. 7b includes a half-sinusoidal current component, each current pulse 58b in FIG. 8a and each resultant power pulse in FIG. 8b includes a half-sinusoidal current component and $3^{rd}$, $5^{th}$ and 7th higher order harmonic current components, and each current pulse 58c in FIG. 9a and each resultant power pulse in FIG. 9b includes a trapezoidal current component.

It was found in each case that the addition of a time delay 56 between consecutive current pulses 58a,58b,58c of the current waveform 46d,46e,46f results in a lower average power 52d,52e,52f of 5 MW dissipated via the resistor 36 when compared to the previous current waveforms 46a,46b, 46c omitting the time delay 56. The use of a time delay 56 between consecutive current pulses 58a,58b,58c of the current waveform 46d,46e,46f has the benefit of reducing loading of the resistor 36, if desired.

Following the removal of excess energy from the DC transmission lines through power dissipation via the resistor 36, the controller switches the switching elements 38 of the modules 34 to switch each capacitor 40 back into circuit with the resistor 36. Such a configuration turns off the current flowing in the first control circuit 30, which allows the DC transmission scheme to revert to normal operation.

It is shown in FIGS. 3 to 9 that any increase 60a in energy level of the chain-link converter 44 is offset by a corresponding decrease 60b in energy level in the same duty cycle, and vice versa. Thus, the modulation of the current waveform in accordance with Equation 1 to form different shapes to vary the characteristics of energy removed from the DC transmission lines maintains a zero net change in energy level of the chain-link converter 44 over each duty cycle of the first control circuit 30, i.e. the energy level of the chain-link converter 44 is the same before and after the operation of the first control circuit 30 to remove energy from the DC transmission lines. Accordingly the individual voltage levels of the capacitors 40 may be maintained at constant values before and after the operation of the first control circuit 30 to remove energy from the DC transmission lines.

In contrast, a non-zero net change in energy level of the chain-link converter 44 would result in a increase or decrease in energy level of the chain-link converter 44 over time, and thereby cause an increase or decrease in voltage level of one or more capacitors 40. It is possible to offset the increase or decrease in energy level of the chain-link converter 44 by using bidirectional power transfer hardware to add or remove energy to each capacitor 40. However, such use adds to the overall size, weight and cost of the first control circuit 30.

In addition, the shape of the current waveform modulated to maintain a zero net change in energy level of the chain-link converter 44 permits the insertion of a capacitor 40 into the current transmission path so that the current waveform flows in either forward or reverse directions through the capacitor 40. This in turn allows selective real-time charging or discharging, and thereby control of the voltage level, of a capacitor 40 whilst the first control circuit 30 is controlled to remove energy from the DC transmission lines.

Such control of the voltage level of a capacitor 40 allows balancing of the individual voltage levels of the capacitors 40, and thereby simplifies the design of the first control circuit 30 by allowing, for example, the use of average voltage value as feedback to control selective removal of the capacitors 40 from the current transmission path.

Moreover the use of the chain-link converter 44 to modulate the current waveform improves control over the rates of change of voltage and current, dv/dt and di/dt, in the first control circuit 30 and thereby avoids fast dv/dt and di/dt transients, which complicates the design of the chain-link converter 44 and create unwanted noise and electromagnetic interference.

The controller may switch the switching elements 38 of the modules 34 to selectively remove one or more capacitors 40 from the current transmission path to charge one or more other capacitors 40. In this way the capacitors 40 are able to selectively absorb real power from the DC transmission lines to offset any operating losses of the chain-link converter 44 and thereby maintain the average energy level of the chain-link converter 44 at a constant value.

A control circuit 70 according to a second embodiment of the invention is shown in FIG. 10. The second embodiment of the control circuit 70 shown in FIG. 10 is similar in terms of structure and operation to the first embodiment of the control circuit 30 in FIG. 2, and like features share the same reference numerals.

The second control circuit 70 differs from the first control circuit 30 in that each module 72 includes first and second sets 74a,74b of series-connected current flow control elements. Each set 74a,74b of current flow control elements includes a switching element 38 to selectively direct current through an energy storage device in the form of a capacitor 40, and a passive current check element in the form of a diode 76 to limit current flow through the module 72 to a single direction. Each switching element 38 includes an insulated gate bipolar transistor connected in parallel with an anti-parallel diode 42.

The first and second sets 74a,74b of series-connected current flow control elements and the capacitor 40 are arranged in a full-bridge arrangement to define a 2-quadrant bipolar rationalised module 72 that can provide zero, positive or negative voltage while conducting current in a single direction.

As with the first control circuit 30, the current waveform flowing through the current transmission path and resistor 36 of the second control circuit 70 may be modulated in accordance with Equation 1 to form different waveform shapes to vary characteristics of energy removed from the DC transmission lines, in particular waveform shapes to vary characteristics of energy removed from the DC transmission lines in a similar manner to that of FIGS. 3 to 9.

The unidirectional nature of the current waveform flowing through the current transmission path and the resistor 36 means that the operation of the second control circuit 70 to remove energy from the DC transmission lines is unaffected by the use of the 2-quadrant bipolar rationalised modules 72, instead of the 4-quadrant bipolar modules 34, in the second control circuit 70. This has the benefit of reducing the size, weight and cost of the chain-link converter 44.

A control circuit 80 according to a third embodiment of the invention is shown in FIG. 11. The third embodiment of the control circuit 80 shown in FIG. 11 is similar in terms of structure and operation to the first embodiment of the control circuit 30 in FIG. 2, and like features share the same reference numerals.

The third control circuit 80 differs from the first control circuit 30 in that each module 82 includes a pair of switching elements 38 connected in parallel with a energy storage device in a half-bridge arrangement to define a 2-quadrant unipolar module 82 that can provide zero or positive voltage and can conduct current in two directions. Each switching element 38 includes an insulated gate bipolar transistor connected in parallel with an anti-parallel diode 42, while each energy storage device is in the form of a capacitor 40.

The voltage rating of the chain-link converter 44 is set to exceed the voltage across the DC transmission lines, $V_{DC}$. When the chain-link converter 44 provides a voltage that is less than the voltage across the DC transmission lines, the current waveform flows through the current transmission path and resistor 36 from the first DC transmission line, which is at $+V_{DC}/2$ to the second DC transmission line, which is at $-V_{DC}/2$. When the chain-link converter 44 provides a voltage that exceeds the voltage across the DC transmission lines, the current waveform flows through the current transmission path and resistor 36 from the second DC transmission line, which is at $-V_{DC}/2$, to the first DC transmission line, which is at $+V_{DC}/2$.

Accordingly the controller may switch the switching elements 38 of the 2-quadrant unipolar modules 82 to selectively remove one or more capacitors 40 from the current transmission path to cause a bidirectional current waveform to flow from the DC transmission lines through the current transmission path and resistor 36, whilst the chain-link converter 44 provides a unidirectional voltage waveform. This permits modulation of the current waveform in accordance with Equation 1 to maintain a zero net change in energy level of the chain-link converter 44.

As with the first and second control circuits 30,70, the current waveform flowing through the current transmission path and resistor 36 of the third control circuit 80 may be modulated in accordance with Equation 1 to form different waveform shapes to vary characteristics of energy removed from the DC transmission lines.

FIGS. 12a and 12b illustrate the characteristics of energy removed from the DC transmission lines using the third control circuit 80 of FIG. 11 when the current waveform flowing through the current transmission path and resistor 36 is modulated to form a bidirectional, half-sinusoidal current waveform 46g.

In order to form such a current waveform 46g, the controller selectively removes each capacitor 40 from the current transmission path to generate a unidirectional, half-sinusoidal voltage waveform 48g across the chain-link converter 44, where the voltage waveform 48g exceeds $V_{DC}$ over part of each duty cycle. Accordingly this causes a bidirectional, half-sinusoidal current waveform 46g to flow from the DC transmission lines through the current transmission path and the resistor 36.

FIG. 12b illustrates the corresponding instantaneous power 50g and average power 52g dissipated via the resistor 36 over each duty cycle of the third control circuit 80. It is shown that, when $V_{DC}$ is 10 kV, the average power 52g dissipated via the resistor 36 is 10 MW. In this case the chain-link converter 44 has a voltage rating that is 27% higher than the voltage across the DC transmission lines, $V_{DC}$.

FIGS. 13a and 13b illustrate the characteristics of energy removed from the DC transmission lines using the third control circuit 80 of FIG. 11 when the current waveform 46h flowing through the current transmission path and resistor 36 is modulated to add a time delay 56 between consecutive half-sinusoidal current pulses 58d so that the durations of each current pulse 58d and each time delay 36 are equal, i.e. a 50:50 duty cycle. It is shown that, when $V_{DC}$ is 10 kV, the average power 52h dissipated via the resistor 36 is 5 MW.

It is envisaged that in other embodiments the controller may selectively remove each capacitor 40 from the current transmission path to modulate the current waveform to include higher order harmonic components, or form a trapezoidal current waveform or other types of current waveforms.

A control circuit 90 according to a fourth embodiment of the invention is shown in FIG. 14. The fourth embodiment of the control circuit 90 shown in FIG. 14 is similar in terms of structure and operation to the first embodiment of the control circuit 30 in FIG. 2, and like features share the same reference numerals.

The fourth control circuit 90 differs from the first control circuit 30 in that the fourth control circuit 90 includes a plurality of resistors 36 connected in series with the plurality of modules 34 between the first and second DC terminals 32a,32b. The resistors 36 and the modules 34 are arranged to define an alternating sequence of resistors 36 and modules 34.

Such an arrangement is advantageous in that each module 34 is grouped with a neighbouring resistor 36 to define a modular section 92 so that the fourth control circuit 90 consists of a plurality of modular sections 92. This allows a thermal management unit (not shown) linked to each module 34 to also be linked to the corresponding resistor 36 in the same modular section 92. Otherwise it would be necessary to install a single, separate thermal management unit for use with the plurality of resistors 36.

The modular arrangement of the fourth control circuit 90 means that it is readily scalable to increase its voltage rating. In contrast, the use of the above single, separate thermal management unit would require substantial redesign and modification of the thermal management unit to correspond to the scale of the fourth control circuit 90.

A control circuit 100 according to a fifth embodiment of the invention is shown in FIG. 15. The fifth embodiment of the control circuit 100 shown in FIG. 15 is similar in terms of structure and operation to the first embodiment of the control circuit 30 in FIG. 2, and like features share the same reference numerals.

The fifth control circuit 100 differs from the first control circuit 30 in that the fifth control circuit 100 further includes a third terminal 102 connected in series between the first and second DC terminals 32a,32b. The plurality of modules is divided into first and second sets of modules 104a,104b. The first set of modules 104a is connected in series with a resistor 36 between the first DC terminal 32a and the third terminal 102, while the second set of modules 104b is connected in series with another resistor 36 between the second DC terminal 32b and the third terminal 102. In use, the third terminal 102 may be connected to ground 106.

Such an arrangement permits a different load to be applied to each of the first and second DC terminals 32a,32b connected to the DC transmission lines, if desired.

The invention claimed is:

1. A control circuit comprising first and second DC terminals for connection to a DC network, the first and second DC terminals having a plurality of modules and at least one energy conversion element connected in series therebetween to define a current transmission path, the plurality of modules defining a chain-link converter, each module including at least one energy storage device, the at least one energy storage device being selectively removable from the current transmission path to cause a current waveform to flow from the DC network through the current transmission path and the at least one energy conversion element and thereby remove energy from the DC network, the at least one energy storage device being selectively removable from the current transmission path to modulate the current waveform to maintain a zero net change in energy level of the chain-link converter, each module further including:
   a) two pairs of switching elements connected in parallel with the at least one energy storage device in a full-bridge arrangement to define a 4-quadrant bipolar module that can provide zero, positive or negative voltage and can conduct current in two directions, or
   b) first and second sets of series-connected current flow control elements, each set of current flow control elements including a switching element to selectively direct current through the or each energy storage device and a passive current check element to limit current flow through the module to a single direction, the first and second sets of series-connected current flow control elements and the or each energy storage device being arranged in a full-bridge arrangement to define a 2-quadrant bipolar rationalized module that can provide zero, positive or negative voltage while conducting current in a single direction.

2. A control circuit according to claim 1, wherein at least one switching element is or includes a semiconductor device.

3. A control circuit according to claim 2, wherein the or each semiconductor device is an insulated gate bipolar transistor, a gate turn-off thyristor, a field effect transistor, an injection enhanced gate transistor or an integrated gate commutated thyristor.

4. A control circuit according to claim 2 wherein at least one switching element further includes an anti-parallel diode connected in parallel with the or each corresponding semiconductor device.

5. A control circuit according to claim 1 wherein the or each energy conversion element is or includes a resistor.

6. A control circuit according to claim 1 wherein the or each energy storage device is or includes a capacitor, a battery, or a fuel cell.

7. A control circuit according to claim 1 including a plurality of energy conversion elements connected in series with the plurality of modules.

8. A control circuit according to claim 7 wherein the energy conversion elements and the modules are arranged to define an alternating sequence of energy conversion elements and modules.

9. A control circuit according to claim 7 further including a third terminal connected in series between the first and second DC terminals, the third terminal being for connection to ground, the plurality of modules including first and second sets of modules, the first set of modules being connected in series with at least one energy conversion element between the first DC terminal and the third terminal, the second set of modules being connected in series with at least one other energy conversion element between the second DC terminal and the third terminal.

10. A control circuit according to claim 1 further including a controller to selectively remove each energy storage device from the current transmission path.

11. A control circuit according to claim 1 wherein the current waveform includes one or more current waveform components.

12. A control circuit according to claim 11 wherein the or each current waveform component is selected from a group including a half-sinusoidal current waveform component, a trapezoidal current waveform component, and higher order harmonic current waveform components.

13. A control circuit according to claim 11 wherein the current waveform is modulated to add or remove one or more current waveform components.

14. A control circuit according to claim 1 wherein the current waveform is modulated to include a plurality of current pulses and add a time delay between consecutive current pulses.

15. A control circuit according to claim 14 wherein the durations of each current pulse and the time delay are equal.

16. A control circuit according to claim 1 wherein the voltage rating of the chain-link converter is set to exceed the voltage of the DC network.

17. A control circuit according to claim 1 wherein the or each energy storage device is selectively removable from the current transmission path to charge one or more other energy storage devices.

* * * * *